(12) United States Patent
Yi et al.

(10) Patent No.: US 10,001,903 B2
(45) Date of Patent: Jun. 19, 2018

(54) MOBILE TERMINAL AND METHOD FOR CONTROLLING THE SAME

(71) Applicant: LG ELECTRONICS INC., Seoul (KR)

(72) Inventors: Sohoon Yi, Seoul (KR); Hyekyung Park, Seoul (KR); Jumin Chi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 319 days.

(21) Appl. No.: 14/602,003

(22) Filed: Jan. 21, 2015

(65) Prior Publication Data

US 2015/0205488 A1 Jul. 23, 2015

(30) Foreign Application Priority Data

Jan. 22, 2014 (KR) ........................ 10-2014-0007809

(51) Int. Cl.
| | |
|---|---|
| *G06F 3/048* | (2013.01) |
| *G06F 3/0481* | (2013.01) |
| *G06F 3/0486* | (2013.01) |
| *G06F 3/0488* | (2013.01) |
| *G06F 3/0482* | (2013.01) |
| *G06F 1/16* | (2006.01) |
| *G06F 3/0484* | (2013.01) |

(52) U.S. Cl.
CPC ........ *G06F 3/04817* (2013.01); *G06F 1/1626* (2013.01); *G06F 3/0482* (2013.01); *G06F 3/0486* (2013.01); *G06F 3/04842* (2013.01); *G06F 3/04883* (2013.01); *G06F 3/04886* (2013.01)

(58) Field of Classification Search
CPC ....................................... G06F 3/0481
See application file for complete search history.

(56) References Cited

U.S. PATENT DOCUMENTS

| | | | | |
|---|---|---|---|---|
| 8,661,369 B2* | 2/2014 | Heo | ........................ | G06F 3/0481 340/10.1 |
| 8,667,415 B2* | 3/2014 | Rudolph | .............. | G06F 17/3089 715/761 |
| 8,914,732 B2* | 12/2014 | Jun | ................... | H04M 1/72572 715/745 |
| 2005/0021748 A1* | 1/2005 | Garcea | ................ | G06F 11/3447 709/224 |
| 2008/0034318 A1* | 2/2008 | Louch | ................... | G06F 3/0486 715/781 |
| 2009/0228820 A1* | 9/2009 | Kim | ..................... | G06F 3/04817 715/769 |

(Continued)

*Primary Examiner* — Ryan F Pitaro
(74) *Attorney, Agent, or Firm* — Birch, Stewart, Kolasch & Birch, LLP

(57) ABSTRACT

A mobile terminal including a wireless communication unit configured to provide wireless communication; a touch screen; and a controller configured to: display a list of previously executed applications as thumbnail images on the touch screen, display first and second slot indicators respectively indicating positions of first and second execution areas, receive a selection input of a first previously executed application from the displayed list, and display an execution screen of the selected first previously executed application on the first execution area.

19 Claims, 23 Drawing Sheets

(56) References Cited

U.S. PATENT DOCUMENTS

| | | | |
|---|---|---|---|
| 2011/0099512 A1* | 4/2011 | Jeong | G06F 3/0481 715/790 |
| 2011/0202872 A1* | 8/2011 | Park | G06F 3/0481 715/790 |
| 2011/0225539 A1* | 9/2011 | Lee | G06F 3/0485 715/784 |
| 2012/0169768 A1* | 7/2012 | Roth | G06F 3/0485 345/629 |
| 2012/0311498 A1* | 12/2012 | Kluttz | G06F 3/0481 715/825 |
| 2013/0002524 A1* | 1/2013 | Sirpal | G06F 1/1616 345/1.3 |
| 2013/0104032 A1* | 4/2013 | Lee | G06F 17/30268 715/234 |
| 2013/0187861 A1* | 7/2013 | Lavallee | G06F 9/543 345/173 |
| 2013/0311937 A1* | 11/2013 | Kim | G06F 3/0481 715/781 |
| 2013/0346912 A1* | 12/2013 | Buening | G06F 3/0488 715/783 |
| 2014/0033119 A1* | 1/2014 | Kim | G06F 3/0481 715/800 |
| 2014/0040797 A1* | 2/2014 | Qian | G06F 3/0481 715/765 |
| 2014/0164966 A1* | 6/2014 | Kim | G06F 3/0488 715/769 |
| 2014/0164991 A1* | 6/2014 | Kim | G06F 3/0481 715/794 |
| 2015/0026615 A1* | 1/2015 | Choi | G06F 3/0484 715/765 |
| 2015/0046871 A1* | 2/2015 | Lewis | G06F 3/04842 715/798 |
| 2015/0067579 A1* | 3/2015 | Jeong | G06F 3/0488 715/781 |
| 2015/0121304 A1* | 4/2015 | Hwang | G06F 3/0481 715/803 |
| 2016/0026272 A1* | 1/2016 | Park | G06F 3/04886 345/173 |
| 2016/0062639 A1* | 3/2016 | Hwang | G06F 3/04883 715/783 |
| 2016/0202852 A1* | 7/2016 | Park | G06F 3/0488 715/781 |
| 2016/0239203 A1* | 8/2016 | Sato | G06F 3/1423 |
| 2016/0246484 A1* | 8/2016 | Kim | G06F 3/04817 |

* cited by examiner

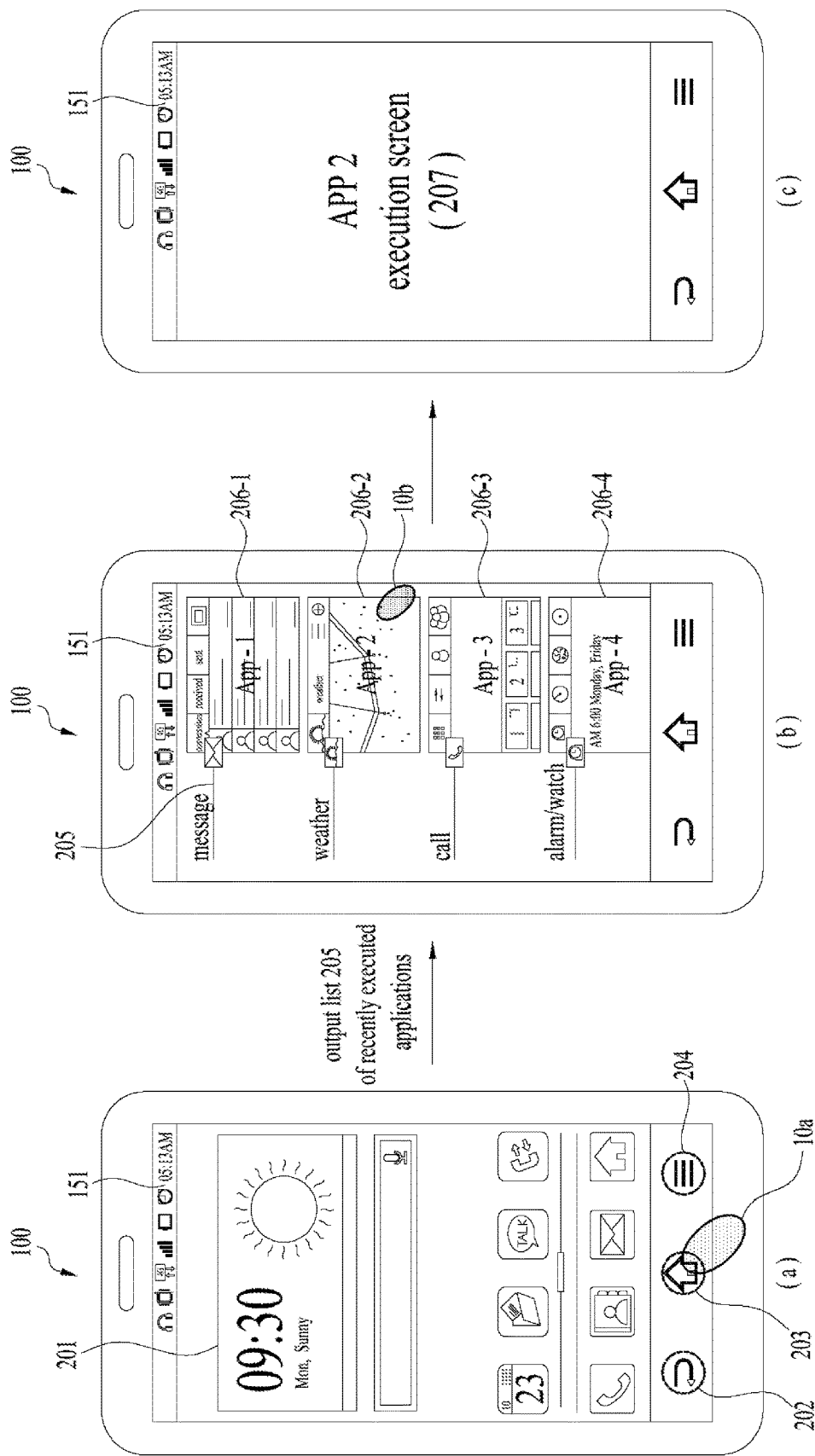

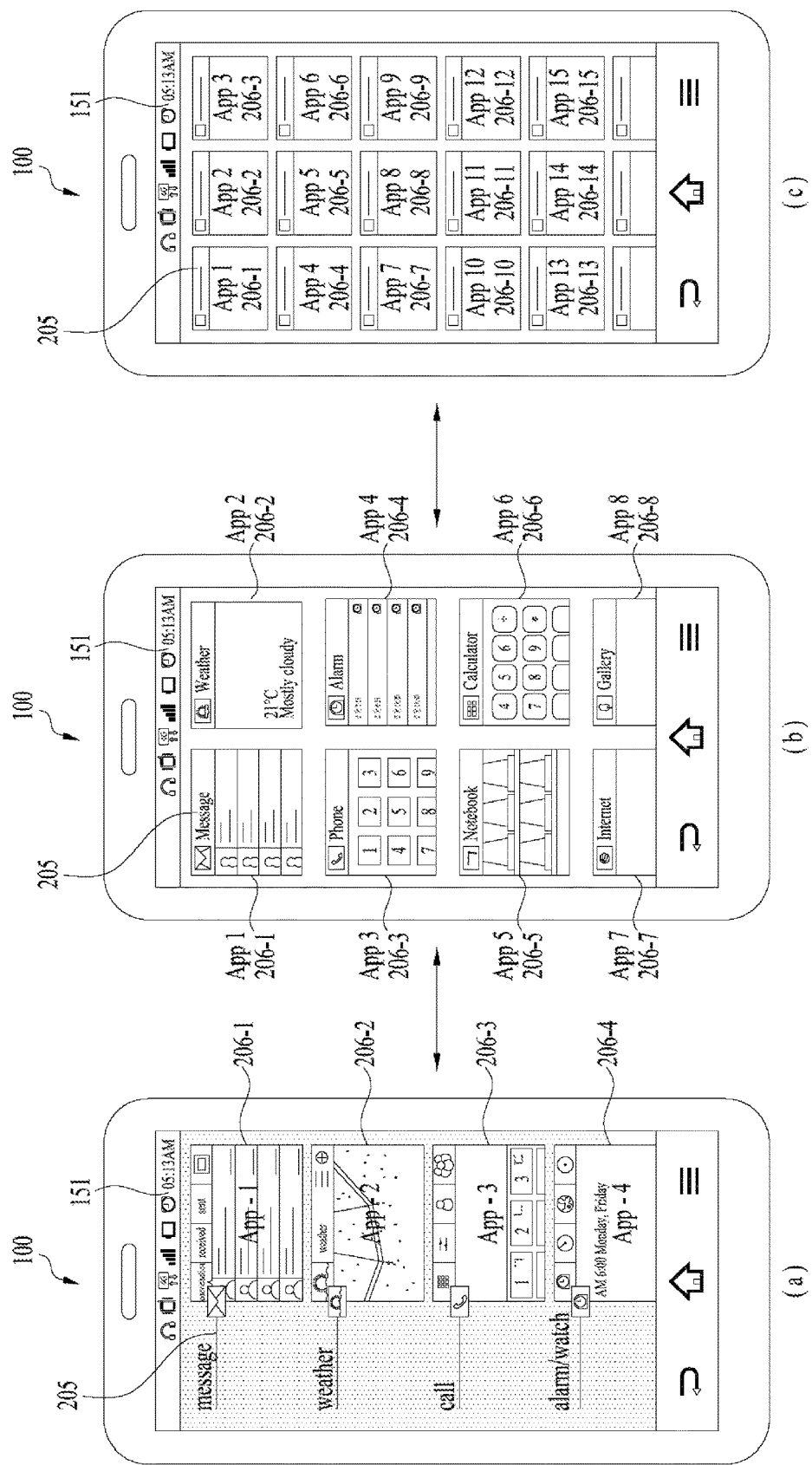

FIG. 9
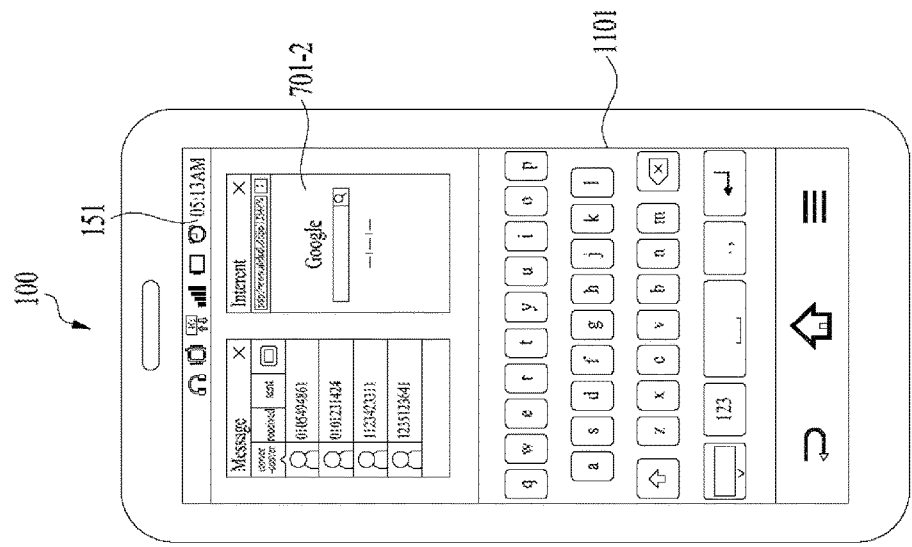
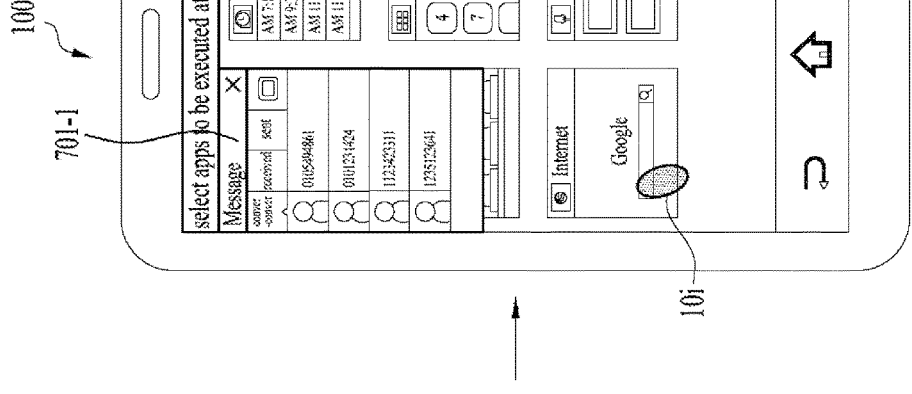
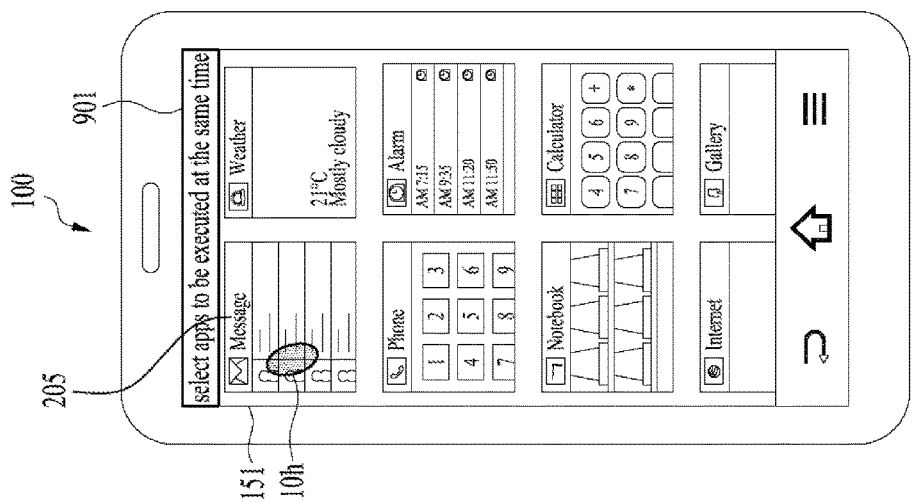

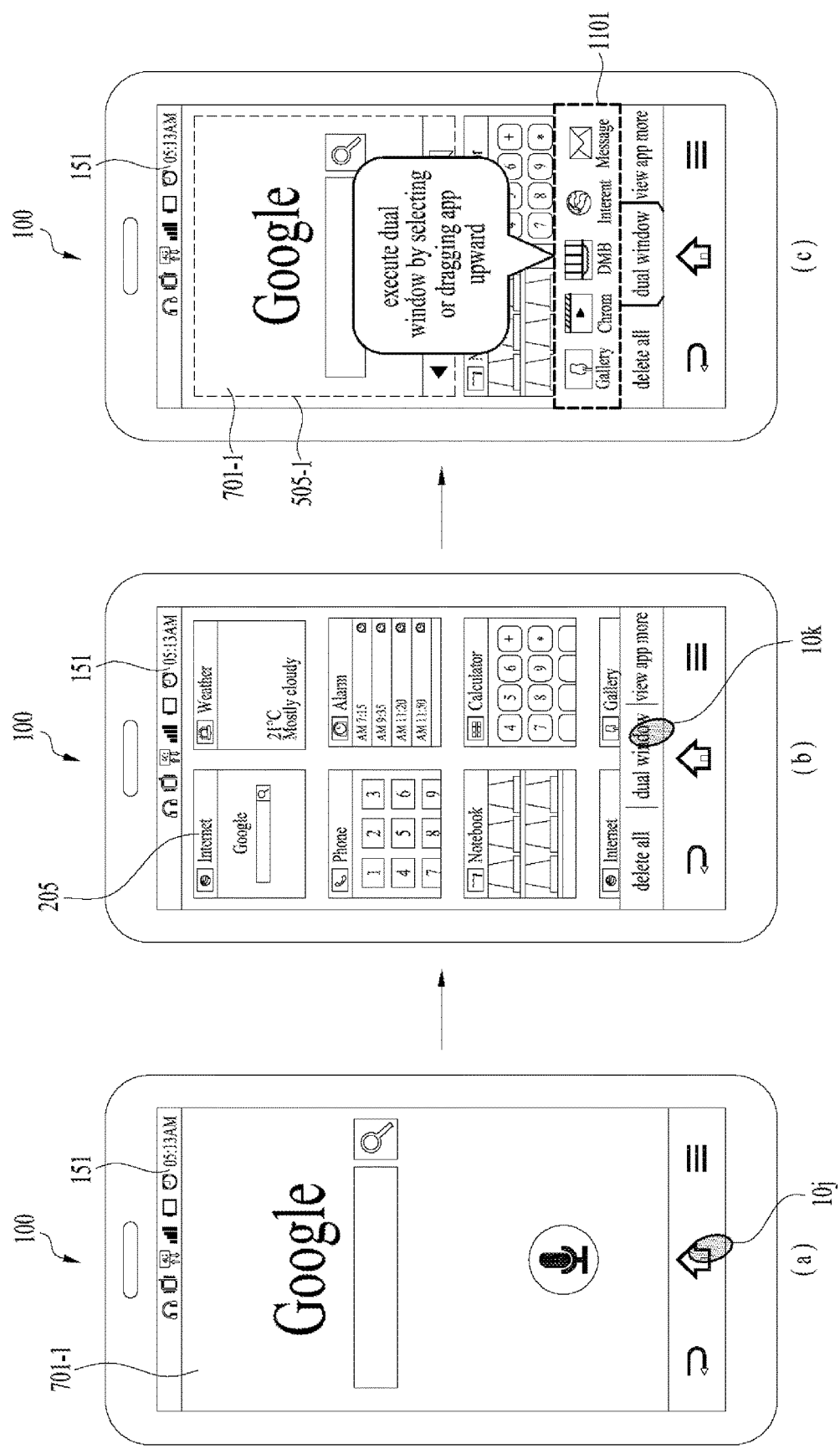

MOBILE TERMINAL AND METHOD FOR CONTROLLING THE SAME

Pursuant to 35 U.S.C. § 119(a), this application claims the benefit of earlier filing date and right of priority to Korean Application No. 10-2014-0007809, filed on Jan. 22, 2014, the contents of which are hereby incorporated by reference herein in their entirety.

BACKGROUND OF THE INVENTION

Field of the Invention

The present invention relates to a mobile terminal enabling a user to more conveniently use the terminal and a method of controlling therefor.

Discussion of the Related Art

A mobile terminal can perform various functions such as data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according. In addition, the mobile terminals can be further classified into handheld terminals and vehicle mounted terminals.

SUMMARY OF THE INVENTION

Accordingly, one object of the present invention is to provide an apparatus and method thereof that substantially obviate one or more problems due to limitations and disadvantages of the related art.

Another object of the present invention is to provide a mobile terminal enabling execution screens of a plurality of applications to be provided at the same time and a method of controlling therefor.

To achieve these objects and other advantages and in accordance with the purpose of the invention, as embodied and broadly described herein, a mobile terminal includes a touch screen and a controller configured to control the touch screen to output a first and a second slot indicator indicating positions of a first and a second execution area, which are used for outputting a list of recently executed applications including a thumbnail image corresponding to each application item and an execution screen of an application, the controller, if an input selecting a first and a second application from the output list of the recently executed applications is received from a user, configured to control the touch screen to output execution screens of the selected first and the second application on the first and the second execution area, respectively.

Both the foregoing general description and the following detailed description of the preferred embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating a control method outputting a list of recently executed applications according to one embodiment of the present invention;

FIG. 3 is a diagram illustrating a control method changing a scale of a list 205 of recently executed applications according to one embodiment of the present invention;

FIG. 9 is a diagram illustrating a control method outputting execution screens for a plurality of applications according to one embodiment of the present invention;

FIG. 11, FIG. 12A and FIG. 12B are diagrams illustrating a state of a control method executing a dual window while outputting an execution screen of a prescribed application according to one embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the description only. Therefore, significant meanings or roles are not given to the suffixes themselves and the 'module', 'unit' and 'part' can be used together or interchangeably. The present invention can be applicable to a various types of mobile terminals. Examples of such terminals include mobile phones, user equipment, smart phones, digital broadcast receivers, personal digital assistants, laptop computers, portable multimedia players (PMP), navigators and the like. However, it is apparent to those skilled in the art that a configuration according to an embodiment disclosed in this specification is applicable to such a fixed terminal as a digital TV, a desktop computer and the like as well as a mobile terminal.

Figure 1A:
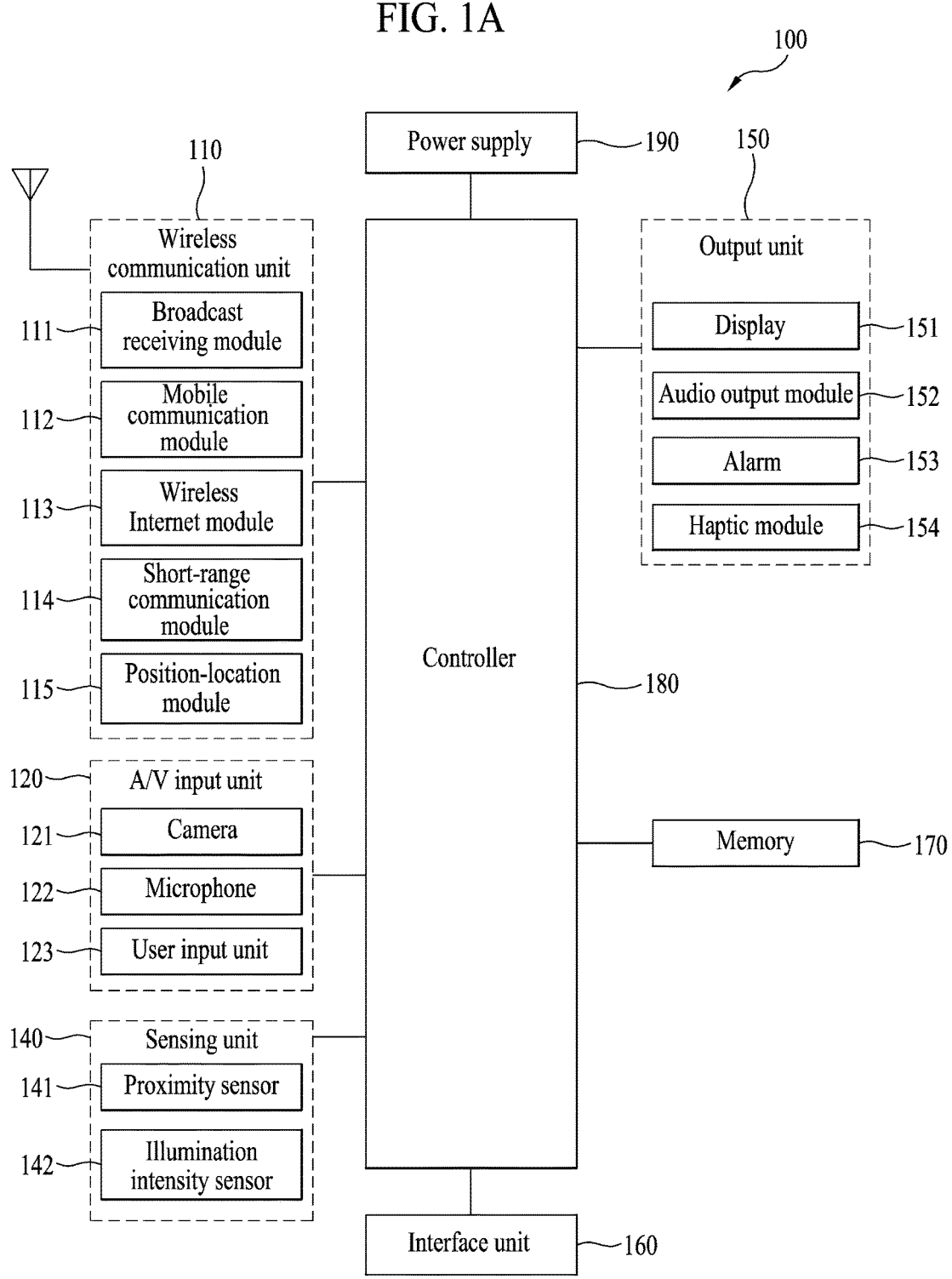
FIG. 1A is a block diagram illustrating a mobile terminal according to one embodiment of the present invention.

FIG. 1A is a block diagram of a mobile terminal 100 in accordance with an embodiment of the present invention. FIG. 1A shows the mobile terminal 100 includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1A shows the mobile terminal 100 having various components, but implementing all of the illustrated components is not a requirement. Greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112. The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. In a non-limiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO) and integrated services digital broadcast-terrestrial (ISDB-T). Optionally, the broadcast receiving module 111 can be configured suitable for other broadcasting systems as well as the above-explained digital broadcasting systems. The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-information module 115 identifies or otherwise obtains the location of the mobile terminal 100. If desired, this module may be implemented with a global positioning system (GPS) module. According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the OPS module 115 can calculate speed information by continuously calculating a real-time current location.

Referring to FIG. 1A, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 for a call mode. The microphone 122 typically includes assorted noise removing algorithms to remove noise generated while receiving the external audio signal.

The user input unit 130 generates input data responsive to user manipulation of an associated input device or devices. Examples of such devices include a button provided to front/rear/lateral side of the mobile terminal 100 and a touch sensor (constant pressure/electrostatic) and may further include a key pad, a dome switch, a jog wheel, a jog switch and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

When the display 151 and the touch sensor configures a mutual layer structure (hereinafter called 'touch screen'), the display 151 can be used as an input device as well as an output device. In this instance, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, the touch sensor can be configured to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

Figure 1B:
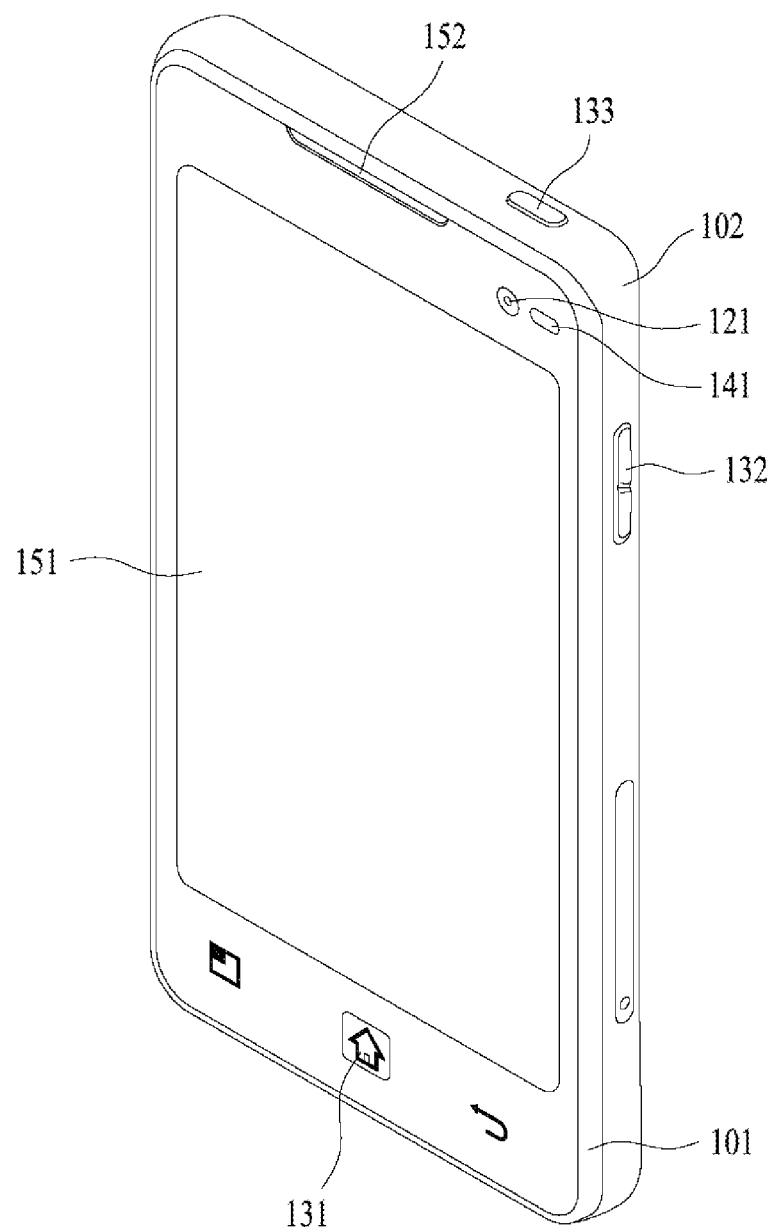
FIGS. 1B and 1C are front and rear perspective diagrams of a mobile terminal according to one embodiment of the present invention.

Referring to FIG. 1B, the proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor 141 has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm 153 is output a signal for announcing the occurrence of a particular event associated with the mobile terminal 100. Typical events include a call received event, a message received event and a touch input received event. The alarm 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100. A projector module can also be included for projecting images stored in the memory 160, externally received etc. The projector module can also be rotated so as to project images in different directions.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output for a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 can include a multimedia module 181 that provides multimedia playback. The multimedia module 181 may be configured as part of the controller 180, or implemented as a separate component. Moreover, the controller

180 can perform a pattern (or image) recognizing process for recognizing a writing input and a picture drawing input performed on the touchscreen as characters or images, respectively.

The power supply 190 provides power required by the various components for the mobile terminal 100. The power may be internal power, external power, or combinations thereof. A battery may include a built-in rechargeable battery and may be detachably attached to the terminal body for a charging and the like. A connecting port may be configured as one example of the interface 170 via which an external charger for supplying a power of a battery charging is electrically connected. Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Next, FIG. 1B is a front perspective diagram of a mobile terminal according to one embodiment of the present invention. The mobile terminal 100 shown in the drawing has a bar type terminal body, however, the mobile terminal 100 may be implemented in a variety of different configurations. Examples of such configurations include folder-type, slide-type, rotational-type, swing-type and combinations thereof. For clarity, the following description will primarily relate to a bar-type mobile terminal 100. However such teachings apply equally to other types of mobile terminals.

Referring to FIG. 1B, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Electronic components can be mounted on a surface of the rear case 102. The electronic part mounted on the surface of the rear case 102 may include such a detachable part as a battery, a USIM card, a memory card and the like. Thus, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Figure 1C:
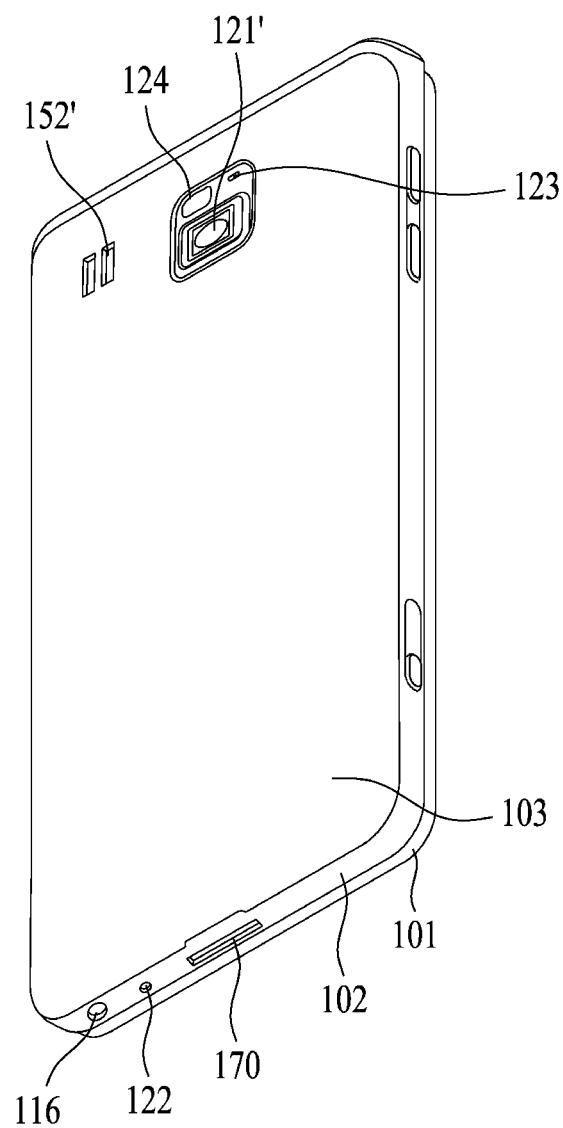

Referring to FIGS. 1B and 1C, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening configured to expose a camera 121' or an audio output unit 152' externally. The cases 101, 102 and 103 are formed by injection molding of synthetic resin or can be formed of metal substance such as stainless steel (STS), titanium (Ti) or the like for example.

A display 151, an audio output unit 152, a camera 121, user input units 130 (131, 132 and 133), a microphone 122, an interface 180 and the like can be provided to the case 101 or 102. The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131, 132 and 133. The manipulating units 131, 132 and 133 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152 and the like can be input to the second manipulating unit 132, a command for a switching to a touch recognizing mode of the display 151 and the like can be input to the manipulating unit 133.

FIG. 1C is a perspective diagram of a backside of the terminal shown in FIG. 3. Referring to FIG. 1C, a camera 121' can be additionally provided to a backside of the terminal body, and more particularly, to the rear case 102. The camera 121' has a photographing direction that is substantially opposite to that of the camera 121 shown in FIG. 1B and may have pixels differing from those of the camera 121.

Preferably, for instance, the camera 121 has low pixels enough to capture and transmit a picture of user's face for a video call, while the camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view their face reflected by the mirror 124.

An additional audio output unit 152' can be provided to the backside of the terminal body. The additional audio output unit 152' can implement a stereo function together with the former audio output unit 152 shown in FIG. 1B and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1A can be retractably provided to the terminal body.

One embodiment of the present invention provides a method of controlling a mobile terminal 100 providing execution screens for a plurality of applications at the same time. Further, the mobile terminal 100 can simultaneously execute a plurality of the applications. An operation of executing a plurality of the applications at the same time is called a multitasking operation.

Meanwhile, although the mobile terminal 100 executes a plurality of the applications at the same time via a multitasking operation, it may be not necessary to output execution screens for all of a plurality of the applications. In particular, there may exist an application executed by the mobile terminal 100 although the application is not output via a touch screen 151. As a representative example, there may exist an application playing music. Although an execution screen of the music playing application is not output via the touch screen 151, the application playing music needs to continuously play music by maintaining an executed state while a user executes a memo application or an application transmitting and receiving a text message. As mentioned in the foregoing description, an application not output via the touch screen 151 in despite of being executed by the mobile terminal 100 is called a background application. In addition, this sort of operation state is called a background state.

Although a second application is executed by receiving an execution command of the second application while outputting an execution screen of a first application, the mobile terminal 100 may not immediately stop executing the first application. In particular, the mobile terminal 100 can execute the first application in the background state while outputting an execution screen of the second application. Meanwhile, in order to easily move between execution screens of applications, one embodiment of the present invention proposes to output a list of recently executed applications. Regarding this embodiment, it shall be described with reference to FIG. 2 in the following.

Next, FIG. 2 is a diagram illustrating a control method outputting a list of recently executed applications according to one embodiment of the present invention. Referring to FIG. 2 (a), the controller 180 displays a home screen 201 via a touch screen 151. The home screen 201 is explained more in the following.

In general, the home screen 201 can be defined by a screen firstly displayed on the touch screen 151 when the touch screen 151 is unlocked. One or more icons or widgets can be displayed on the home screen to execute an application or an internal function. Not only one but also two or more home screens may exist in the mobile terminal. In this instance, if a prescribed touch gesture is performed on the touch screen 151, the two or more home screens 201 can be sequentially displayed one by one. Icons (widgets) different from each other can be arranged to each of the home screens 201.

The controller 180 according to one embodiment of the present invention can output a first to a third button 202 to 204 on a touch screen 151. If one of the first to the third button 202 to 204 is touched and selected, a function corresponding to the selected button can be executed. The first button 202 corresponds to a button used for undoing (cancelling) a most recently executed user command. In particular, if an input selecting the first button 202 is received, the controller 180 can cancel a function most recently performed in response to the user command.

The second button 203 corresponds to a button used for outputting a home screen 201. Hence, if an input selecting the second button 203 is received while an execution screen of a prescribed application is output, the controller 180 stops outputting the execution screen of the application and then outputs the home screen 201. Meanwhile, if an input selecting the second button 203 is received while the home screen 201 is output, the controller 180 can perform no operation.

The third button 204 corresponds to a button used for outputting a menu list. If an input selecting the third button 204 is received, the controller 180 displays a prescribed menu list to receive a selection of a menu item from a user. If a prescribed touch gesture 10a is input to the second button 203, the controller 180 displays a list 205 of recently executed applications. An example of the prescribed touch gesture 10a includes an input maintaining the touch for more than a prescribed time.

FIG. 2 (b) is a diagram illustrating the list 205 of the recently executed applications being output. Referring to FIG. 2 (b), the output list 205 of the recently executed applications can include thumbnail images respectively corresponding to a first to a fourth application item 206-1 to 206-4. According to one embodiment of the present invention, the list 205 of the recently executed applications can be output by being arranged in a recently executed order. If the entire list 205 of the recently executed applications can't be output on the touch screen 151, items not output on the touch screen can be provided in a screen scroll form.

If an input selecting an item from the list 205 of the recently executed applications is received, the controller 180 executes an application corresponding to the selected item. In addition, as shown in FIG. 2 (c), the controller 180 can output an execution screen of the executed application on the touch screen 151. Meanwhile, one embodiment of the present invention changes a scale on which the list 205 of the recently executed applications is displayed in response to a prescribed command of a user. This feature will now be described with reference to FIG. 3.

In particular, FIG. 3 is a diagram illustrating a control method changing a scale of a list 205 of recently executed applications according to one embodiment of the present invention. In this instance, the scale of the list 205 of the recently executed applications indicates size of items output on a touch screen 151 among items included in the list 205 of the recently executed applications.

FIG. 3 (a), FIG. 3 (b) and FIG. 3 (c) show examples of a largest scale, a medium scale and a smallest scale, respectively. In FIG. 3 (a) showing the largest scale, the controller 180 displays 4 application items only among the list 205 of the recently executed applications. In FIG. 3 (b) showing the medium scale, the controller 180 displays 7 application items among the list 205 of the recently executed applications. In FIG. 3 (c) showing the smallest scale, the controller 180 displays 15 application items among the list 205 of the recently executed applications.

If a command for decreasing a scale is received from a user, the controller 180 can sequentially change the scale from FIG. 3 (a) to (b) and from (b) to (c). In addition, if a command for increasing a scale is received from a user, the controller 180 can sequentially change the scale from FIG. 3 (c) to (b) and from (b) to (a). An example of the command decreasing the scale includes a pinch-out touch gesture input on the touch screen 151. An example of the command increasing the scale includes a pinch-in touch gesture input on the touch screen 151.

Figure 4:
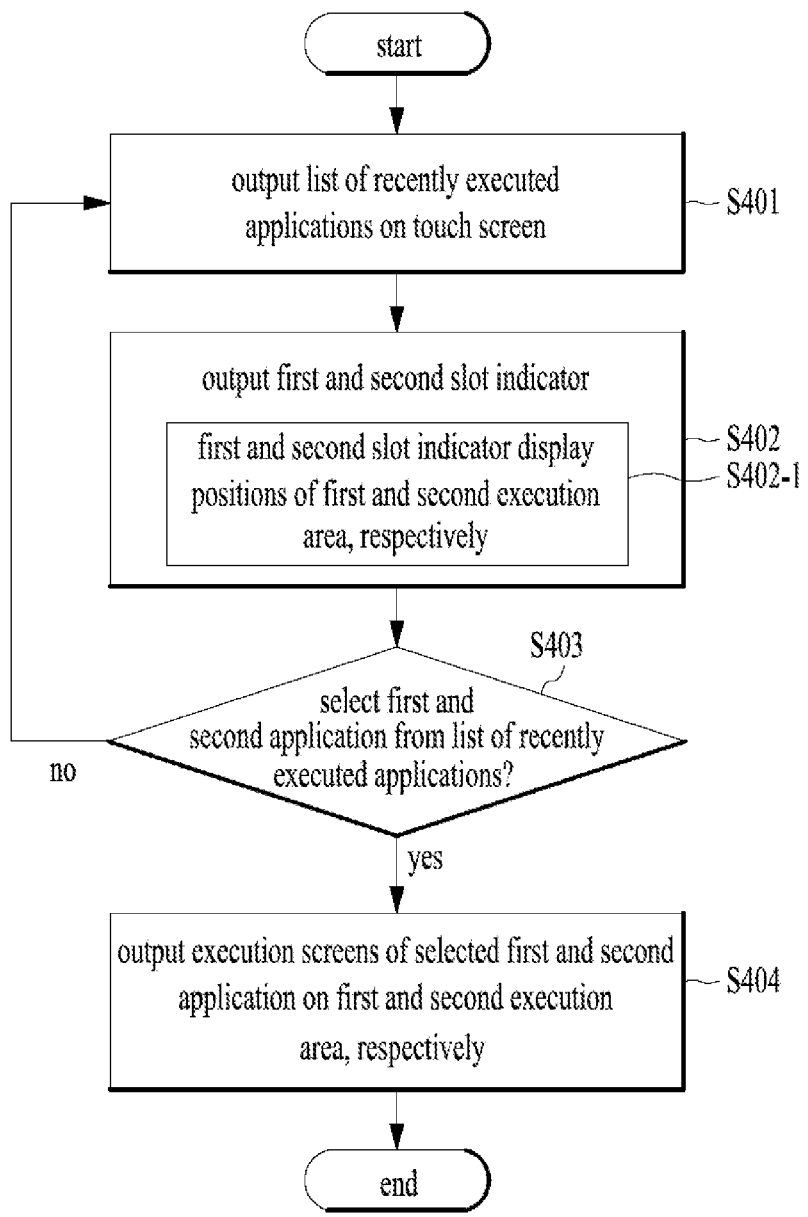
FIG. 4 is a flowchart illustrating a control method outputting execution screens of a plurality of applications according to one embodiment of the present invention.

In the following, one embodiment of the present invention is explained based on the change of the list 205 of the recently executed applications mentioned in the foregoing description. In particular, FIG. 4 is a flowchart illustrating a control method outputting execution screens of a plurality of applications according to one embodiment of the present invention. In the following, the flowchart depicted in FIG. 4 is explained together with diagrams depicted in FIGS. 5 to 7.

In the step S401, the controller 180 can output a list 205 of recently executed applications on a touch screen 151. As mentioned earlier with reference to FIG. 2, the list 205 of the recently executed applications can be output in response to a prescribed touch gesture input on the aforementioned second button 203. The second button 203 can also be located at the first button 202 or third button 204. That is, the arrangement of the buttons is not limited to that shown in the drawings.

Figure 5:
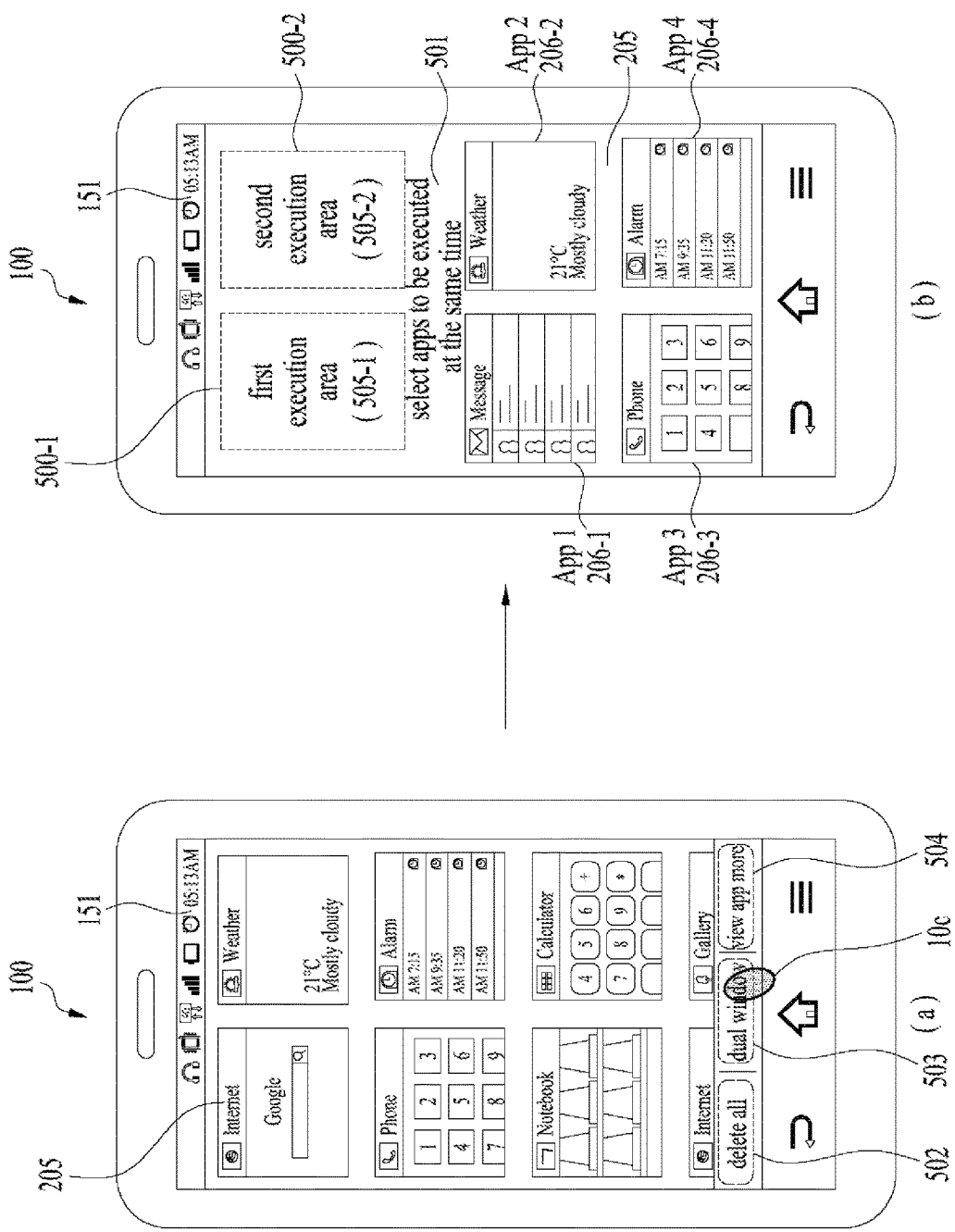
FIG. 5 is a diagram illustrating a state of outputting a slot indicator to indicate an execution area of an application according to one embodiment of the present invention.

In the step S402, the controller 180 can output a first and a second slot indicator 500-1/500-2. The first and the second slot indicator 500-1/500-2 are explained with reference to FIG. 5 in the following. In particular, FIG. 5 is a diagram illustrating outputting a slot indicator to indicate an execution area of an application according to one embodiment of the present invention. Referring to FIG. 5 (a), the controller 180 displays a list 205 of recently executed applications and can output a fourth to a sixth button 502 to 504 together with the list 205 of the recently executed applications.

The fourth button 502 corresponds to a button used for deleting all items included in the output list 205 of the recently executed applications. The fifth button 503 (hereinafter called a dual window button) corresponds to a button used for executing a dual window according to one embodiment of the present invention. A first execution area 505-1 and a second execution area 505-2, which are used for respectively outputting execution screens of applications different from each other, are called a dual window in a detail explanation of one embodiment of the present invention. In addition, an operation of outputting the first and the second execution area 505-1/505-2 is called execution of the dual window.

Regarding the sixth button (hereinafter view app more button) 504, it shall be described with reference to FIG. 6 in the following. Meanwhile, in order to execute the dual window, two applications outputting execution screens are specified. Before the two applications are specified, the execution screens are not output to the first and the second execution area 505-1/505-2 included in the dual window. Hence, one embodiment of the present invention outputs a first and a second slot indicator 500-1/500-2 to indicate the first and the second execution areas 505-1/505-2 before the applications are specified (refer to FIG. 5 (b)).

If an input selecting the dual window button 503 is received, as shown in FIG. 5 (b), the controller 180 can output a first and a second slot indicator 500-1/500-2 respectively indicating the first and the second execution area 505-1/505-2 on the touch screen 151. Each of the first and the second slot indicator 500-1/500-2 can indicate a position and/or a size of the first and the second execution area 505-1/505-2.

In one embodiment of the present invention, a method of specifying a first and a second application can be classified into two methods. First of all, the first and the second application can be selected by a user via an application list. Secondly, the first application is selected by a user and the second application can be configured by a most recently executed application (or a currently executing application). One embodiment of the present invention described in the following specifies applications based on the aforementioned two methods.

Referring to FIG. 5 (b), the controller 180 can output a list 205 of recently executed applications together with a first and a second slot indicator 500-1/500-2. The controller 180 also outputs a guide phrase 501 to ask a user to select applications and the user can select a first and a second application from the output list 205 of the recently executed applications. An input selecting the applications from the output list 205 of the recently executed applications shall be explained later with reference to FIG. 7.

Returning to FIG. 4, in the step S403, if the first and the second application are selected from the list 205 of the recently executed applications, the controller 180 can proceed to the step S404. If not, the controller 180 can return to the step S401. In the step S404, the controller 180 can output execution screens of the selected first and the second application on the first and the second execution area 505-1/505-2, respectively.

The view app more button 504 corresponds to a button used for outputting a list of applications according to one embodiment of the present invention. Functions capable of being performed by the view app more button 504 are described in detail with reference to FIG. 6 in the following. In particular, FIG. 6 is a diagram illustrating a control method outputting a list of applications arranged based on a prescribed criteria according to one embodiment of the present invention.

Figure 6:
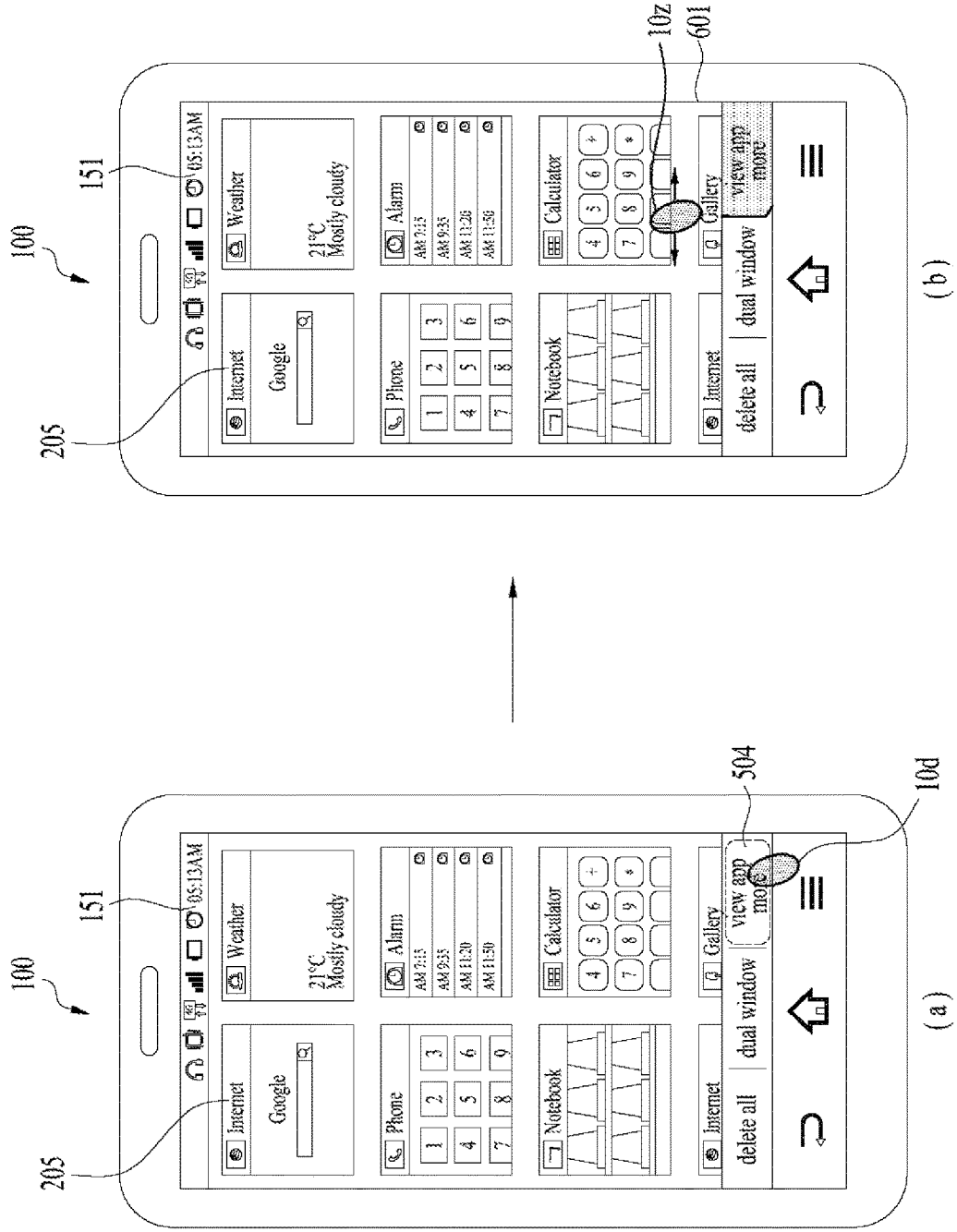
FIG. 6 is a diagram illustrating a control method outputting a list of applications arranged based on a prescribed criteria according to one embodiment of the present invention.

Referring to FIG. 6 (a), the controller 180 displays a view app more button 504 together with a list 205 of recently executed applications. The view app more button 504 corresponds to a button used for outputting a list of application arranged based on a prescribed criteria. If an input 10d selecting the view app more button 504 is received, as shown in FIG. 6 (b), the controller 180 can output a list 601 of applications arranged based on a prescribed criteria. In one embodiment of the present invention, frequency is used for the prescribed criteria. In particular, if the input 10d selecting the view app more button 504 is received, the controller 180 can output a list 601 of applications arranged by a high frequency order. If there exist items not output on a touch screen 151 among the list 601 of the applications, the items not output on the touch screen can be provided in response to a scroll input 10z of a user.

Figure 7:
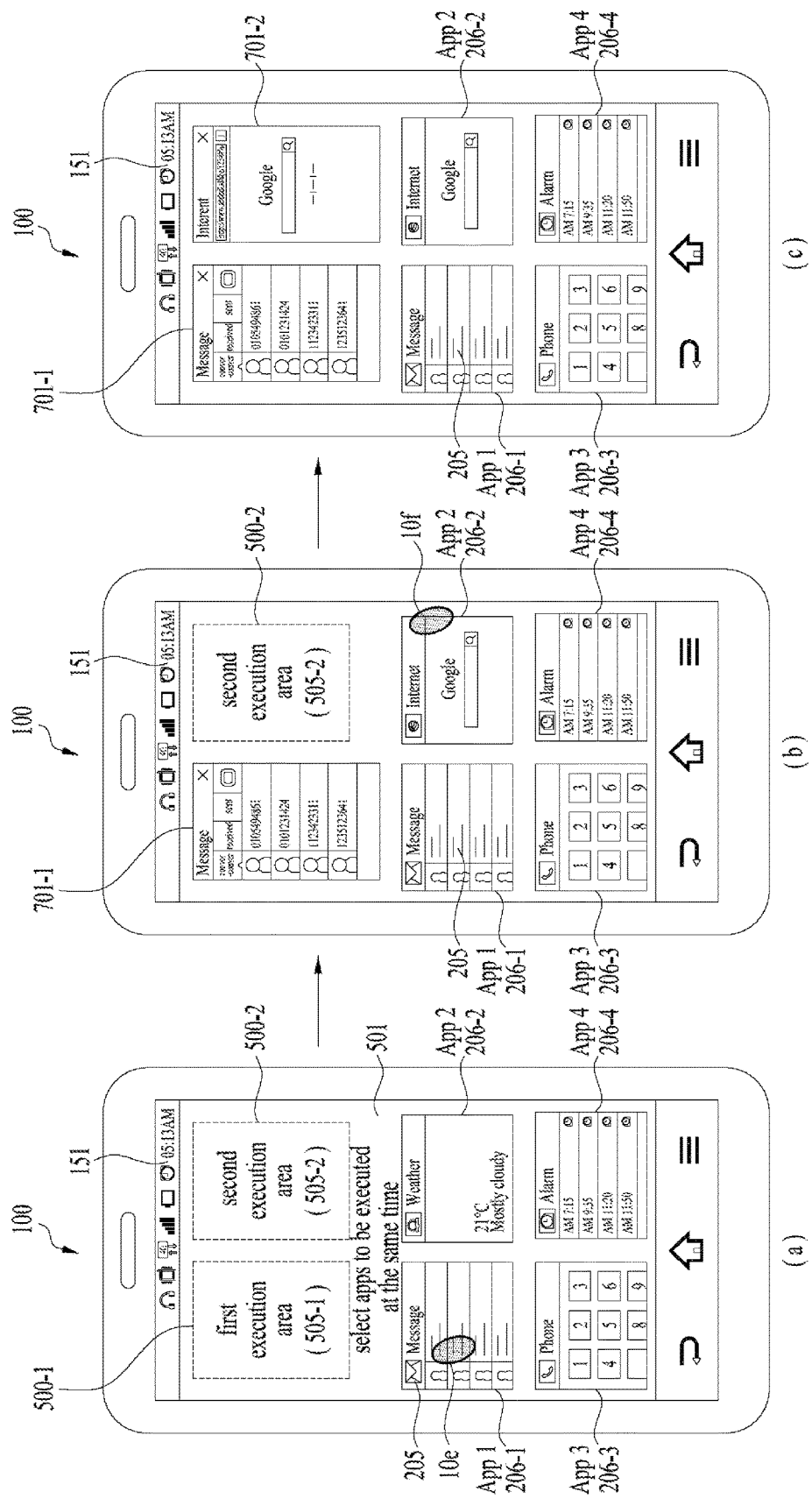
FIG. 7 is a diagram illustrating a control method specifying a first and a second application respectively outputting an execution screen to a first and a second execution area 505-1/505-2 according to one embodiment of the present invention.

Next, FIG. 7 is a diagram illustrating a control method specifying a first and a second application respectively outputting an execution screen to a first and a second execution area 505-1/505-2 according to one embodiment of the present invention. In embodiment shown in FIG. 7, the first and the second application are selected by a user.

Referring to FIG. 7 (a), the controller 180 displays a list 205 of recently executed applications, a first execution area 505-1 and a second execution area 505-2. One embodiment of the present invention provides that a first and a second application are specified in response to selection inputs, which are sequentially input on the list 205 of the recently executed applications.

Referring to FIG. 7 (a), if an input 10e selecting a first application item 206-1 is received, as shown in FIG. 7 (b), the controller 180 can output a first application execution screen 701-1 corresponding to the first application item 206-1 on a first execution area 505-1. Subsequently, referring to FIG. 7 (b), if an input selecting a second application item 206-2 is received, as shown in FIG. 7 (c), the controller 180 can output a second application execution screen 701-2 corresponding to the second application item 206-2 on a second execution area 505-2.

Meanwhile, according to one embodiment of the present invention, as an example of an input selecting an application item from the output list 205 of the recently executed applications, the input may correspond to an input touching the application item. As a different example of the input may correspond to an input touching the application item and dragging the application item to a preferred execution area while the touch is maintained.

Figure 8:
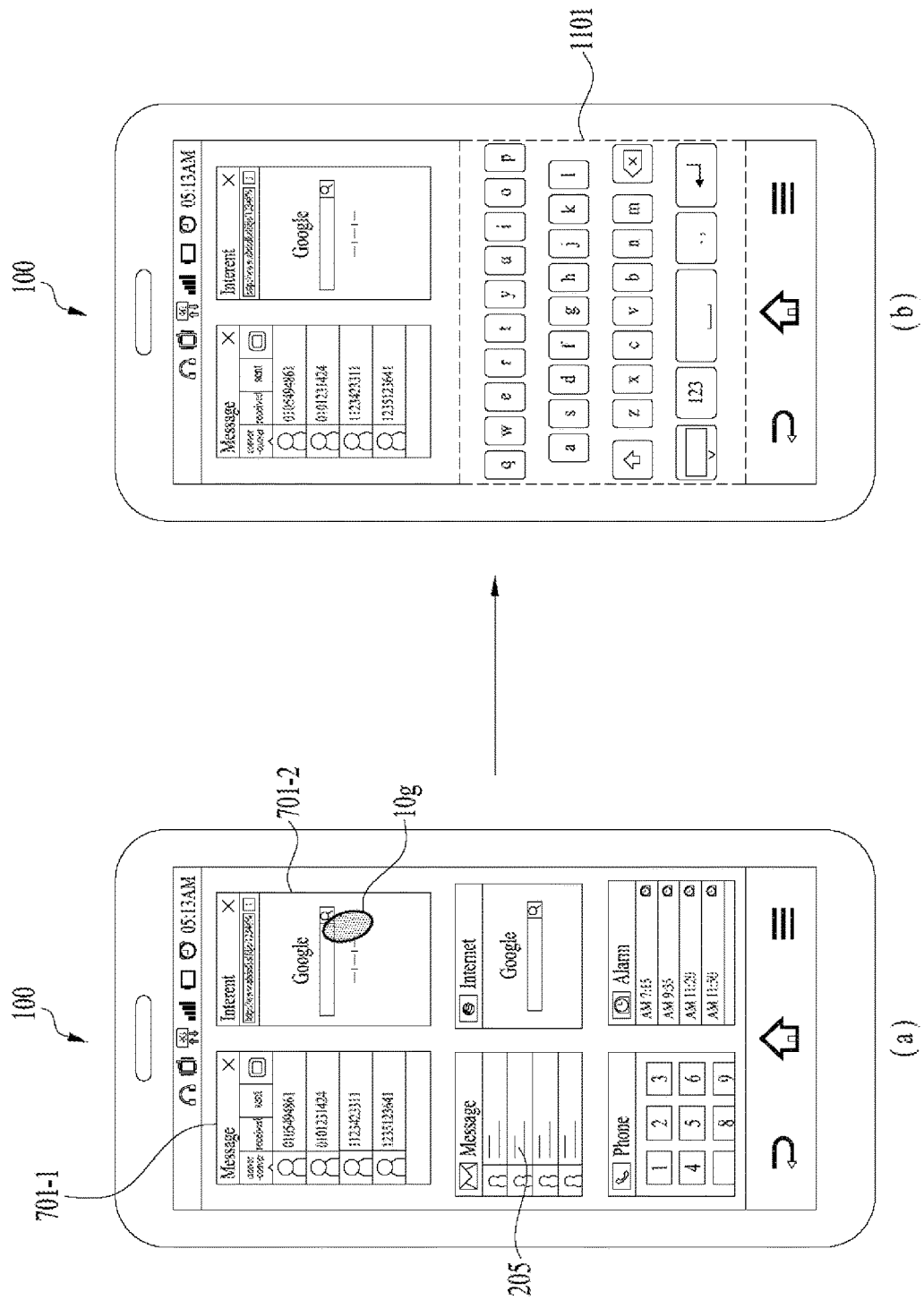
FIG. 8 is a diagram illustrating a control method outputting a first application execution screen 701-1, a second application execution screen 701-2 and a virtual keypad according to one embodiment of the present invention.

In the following description, a control method operating execution screens of the first and the second application is explained with reference to FIG. 8. FIG. 8 is a diagram illustrating a control method outputting a first application execution screen 701-1, a second application execution screen 701-2 and a virtual keypad according to one embodiment of the present invention.

Referring to FIG. 8 (a), the controller 180 displays the first application execution screen 701-1 and the second application execution screen 701-2 via a dual window. If an output of a virtual keypad is necessary, as shown in FIG. 8 (b), the controller 180 can display a virtual keypad on a prescribed area 1101 of a touch screen 151. The output of the virtual keypad is used when an input touching 10g a space where a text input is available among an execution screen of an application is received.

Referring to an example shown in FIG. 8 (a), a second application execution screen 701-2 corresponds to an execution screen of a search engine application. If an input touching 10g a search window is received, the controller 180 can display a virtual keypad in response to the touch 10g. This is because the search window is a space where a text input is available, and if an input touching 10g the search window is received, the controller 180 displays the virtual keypad to receive a search word from a user.

According to the aforementioned embodiment of the present invention, the controller 180 controls slot indicators to be output to indicate execution areas. According to a different embodiment of the present invention, an execution area is not output until an application is specified. This embodiment is explained with reference to FIG. 9 in the following.

FIG. 9 is a diagram illustrating a control method outputting execution screens for a plurality of applications according to one embodiment of the present invention. Referring to FIG. 9, the controller 180 displays a list 205 of recently executed applications. In addition, the controller 180 can output a guide phrase 901 to ask a user to select applications.

If a first application is selected from the output list 205 of the recently executed applications, the controller 180 can output a first execution screen 701-1 for the selected first application. As shown in an example of FIG. 9 (b), the first execution screen 701-1 can be output on an area of a touch screen 151. Subsequently, if a second application is selected from the output list 205 of the recently executed applications, the controller 180 can output a second execution screen 701-2 for the selected first application together with the output first execution screen 701-1.

In particular, the controller 180 can provide a user with execution screens for the two applications by outputting the first and the second execution screen 701-1/701-2 together. As shown in an example of FIG. 9 (c), if a text input is required, the controller 180 can output a virtual keypad on a prescribed area 1101 of a touch screen 151. According to the aforementioned embodiment, when specifying two applications to execute a dual window, the two applications are selected by a user via a list of applications. In the following, embodiment of selecting one application only selected by a user is explained.

Figure 10:
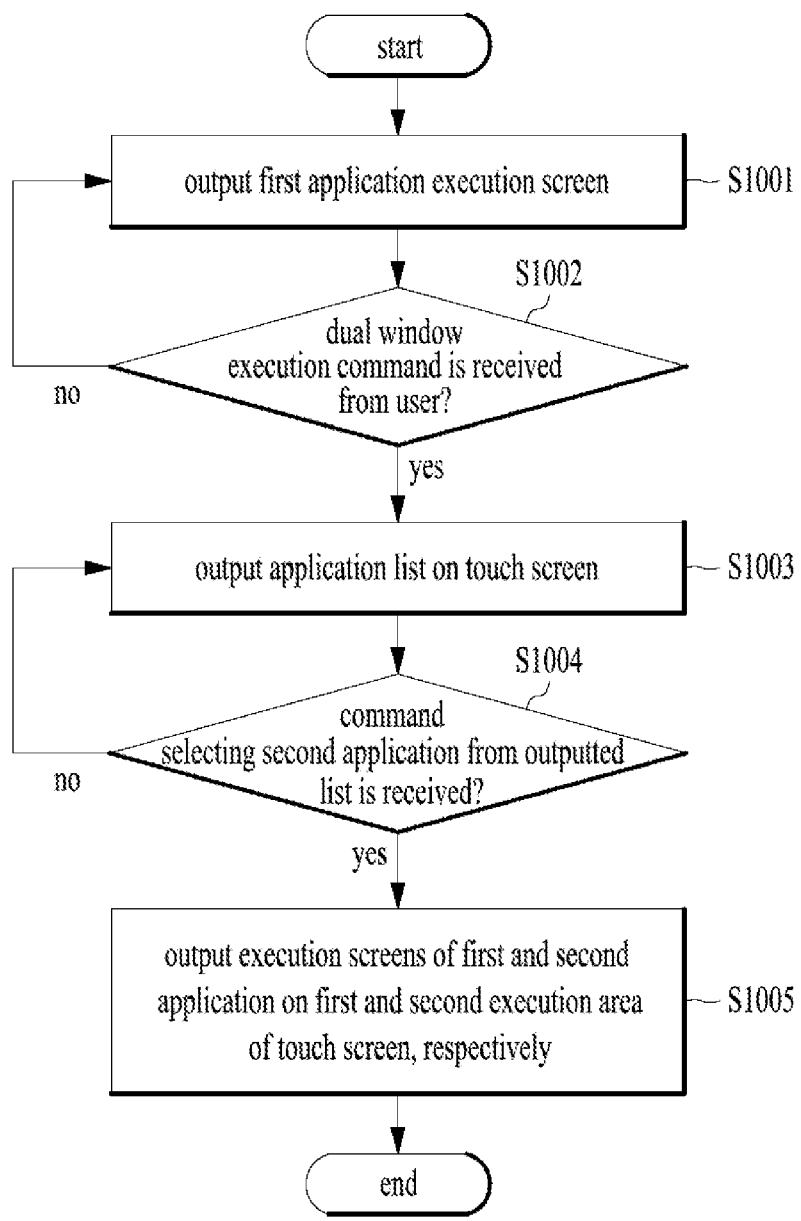
FIG. 10 is a flowchart for a control method executing a dual window while outputting an execution screen of a prescribed application according to one embodiment of the present invention.
Figure 12A:
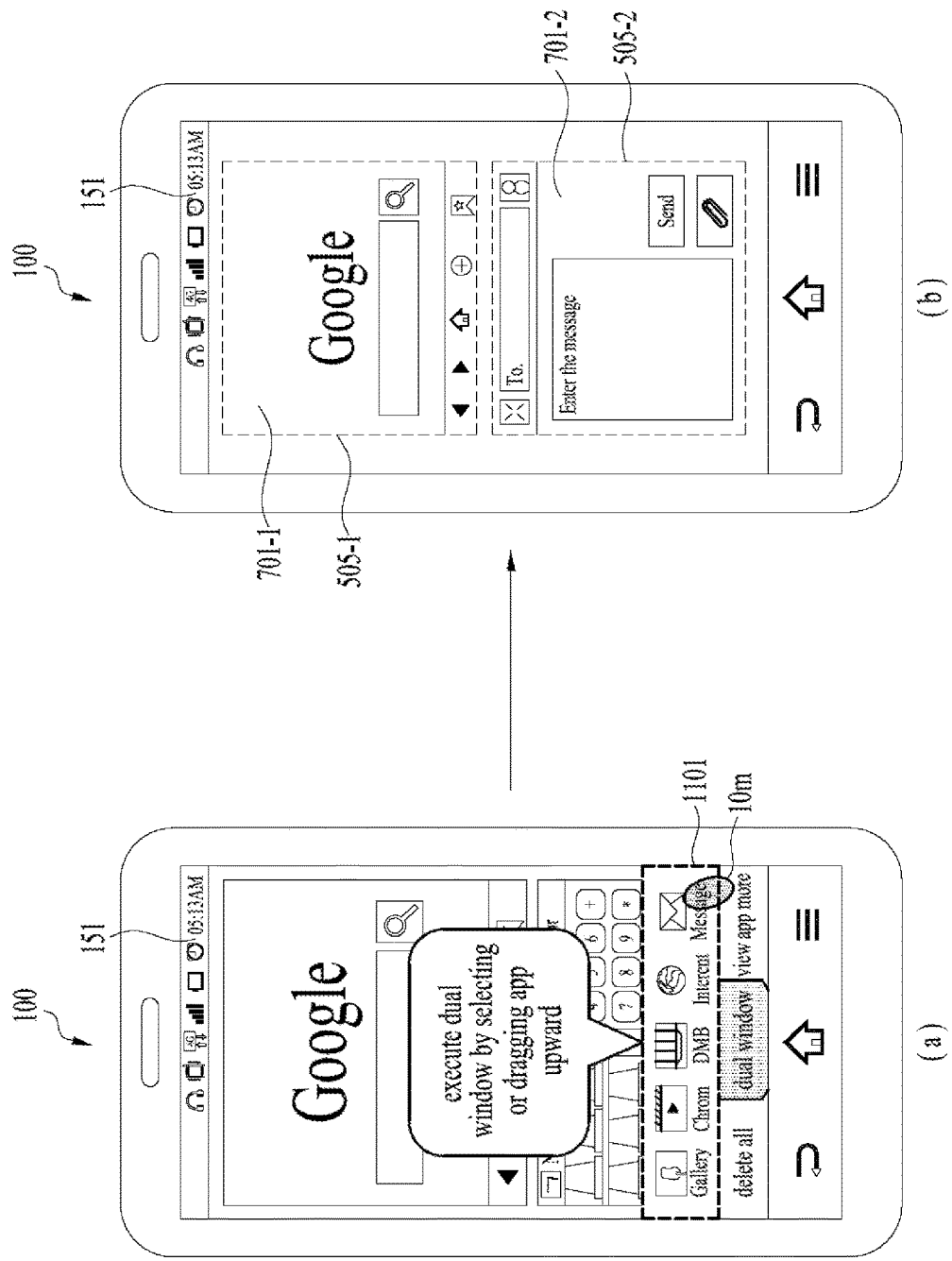
Figure 12B:
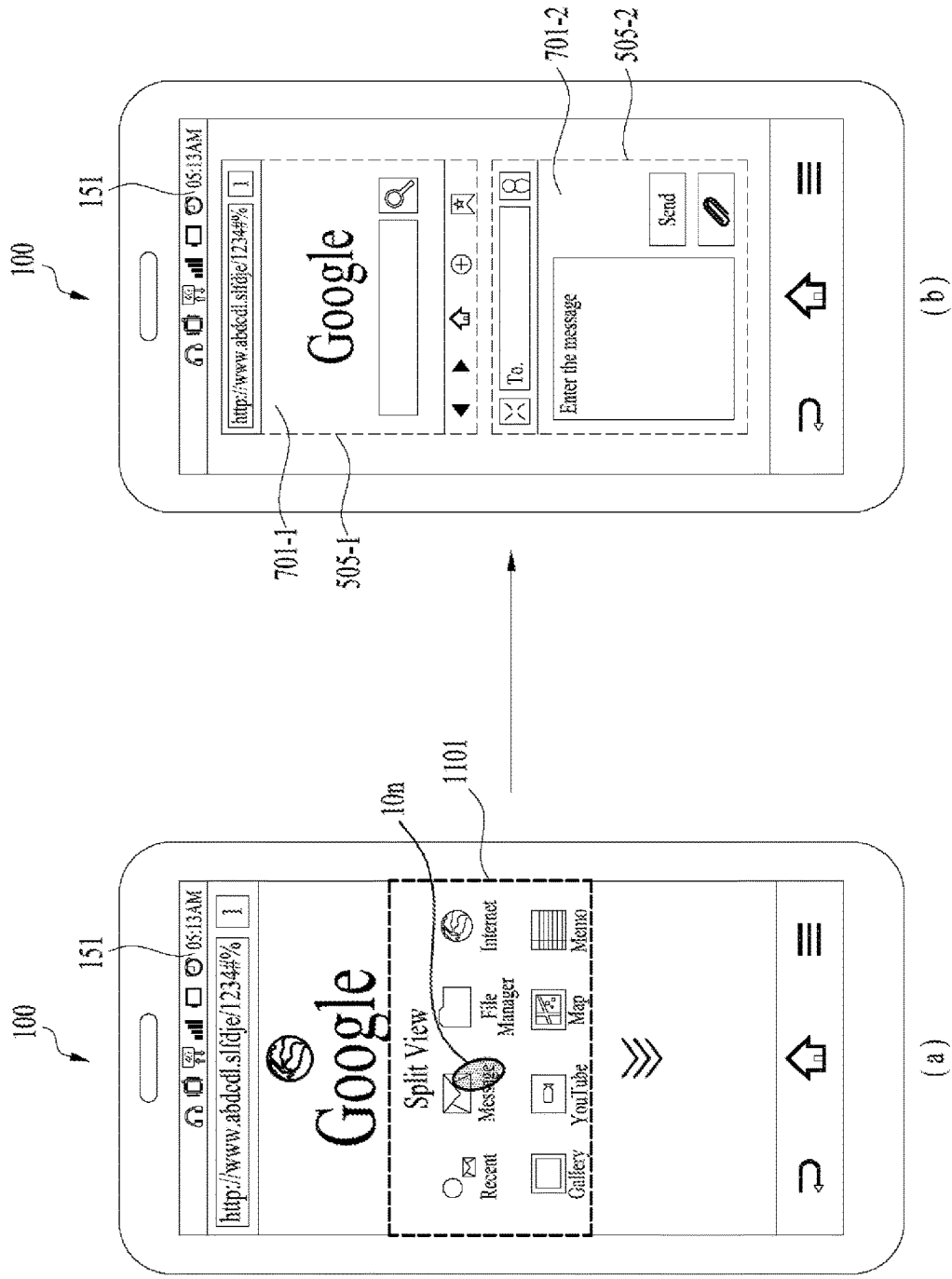

FIG. 10 is a flowchart illustrating a control method executing a dual window while outputting an execution screen of a prescribed application according to one embodiment of the present invention. FIG. 11, FIG. 12A and FIG. 12B are diagrams illustrating a control method executing a dual window while outputting an execution screen of a prescribed application according to one embodiment of the present invention. The following description is explained with reference to FIG. 10 to FIG. 12 together.

As shown in FIG. 11 (a), in the step S1001, the controller 180 displays a first application execution screen 701-1. If a command for outputting a list 205 of recently executed applications is received, as shown in FIG. 11 (b), the controller 180 can output the list 205 of the recently executed applications. As mentioned earlier in FIG. 2, the command for outputting the list 205 of the recently executed applications may correspond to an input touching a second button 202 for more than a prescribed time.

In the step S1002, the controller 180 determines whether an execution command of a dual window is received from a user. If the dual window execution command is not received, the controller 180 returns to the step S1001. If the dual window execution command is received, the controller proceeds to the step S1003. As an example of the dual window execution command, the dual window execution command may correspond to an input touching 10k a dual window button 503.

If the dual window execution command is received, the controller 180 can output the first application execution screen 701-1 on a first execution area 505-1 of the touch screen 151. In particular, the first application execution screen 701-1, which is displayed on the entire touch screen 151 is reduced and displayed on the first execution area 505-1.

In the step S1003, as shown in FIG. 11 (c), the controller 180 can display a list 1101 of applications on the touch screen 151. The controller 180 displays the list 1101 to receive a selection of a second application from a user. The list 1101 of the applications may correspond to a list of applications arranged by a prescribed criteria. For instance, the list of the applications may correspond to a list of applications arranged by a high frequency order.

In the step S1004, the controller 180 waits for an input selecting a second application from the list 1101 of the applications. If the input selecting the second application is not received, the controller repeats the step S1003. If the input selecting the second application is received, the controller 180 proceeds to the step S1005. As shown in an example of FIG. 12A (a), a 'message application' is selected as the second application using an input touching 10m an item of the message application. In the step S1005, as shown in FIG. 12A (b), the controller 180 displays the first application execution screen 701-1 on the first execution area 505-1 and displays the second application execution screen 701-2 on a second execution area 505-2.

Meanwhile, FIG. 12B is a diagram illustrating the list 1101 of applications in a different form from the list of the applications shown in FIG. 12A. If an input 10n selecting a second application from the list 1101 of the applications shown in FIG. 12B (a) is received, the controller 180 can proceed to the step S1005. In the step S1005, operations of the controller 180 are similar to what is mentioned earlier in FIG. 12A.

Figure 13:
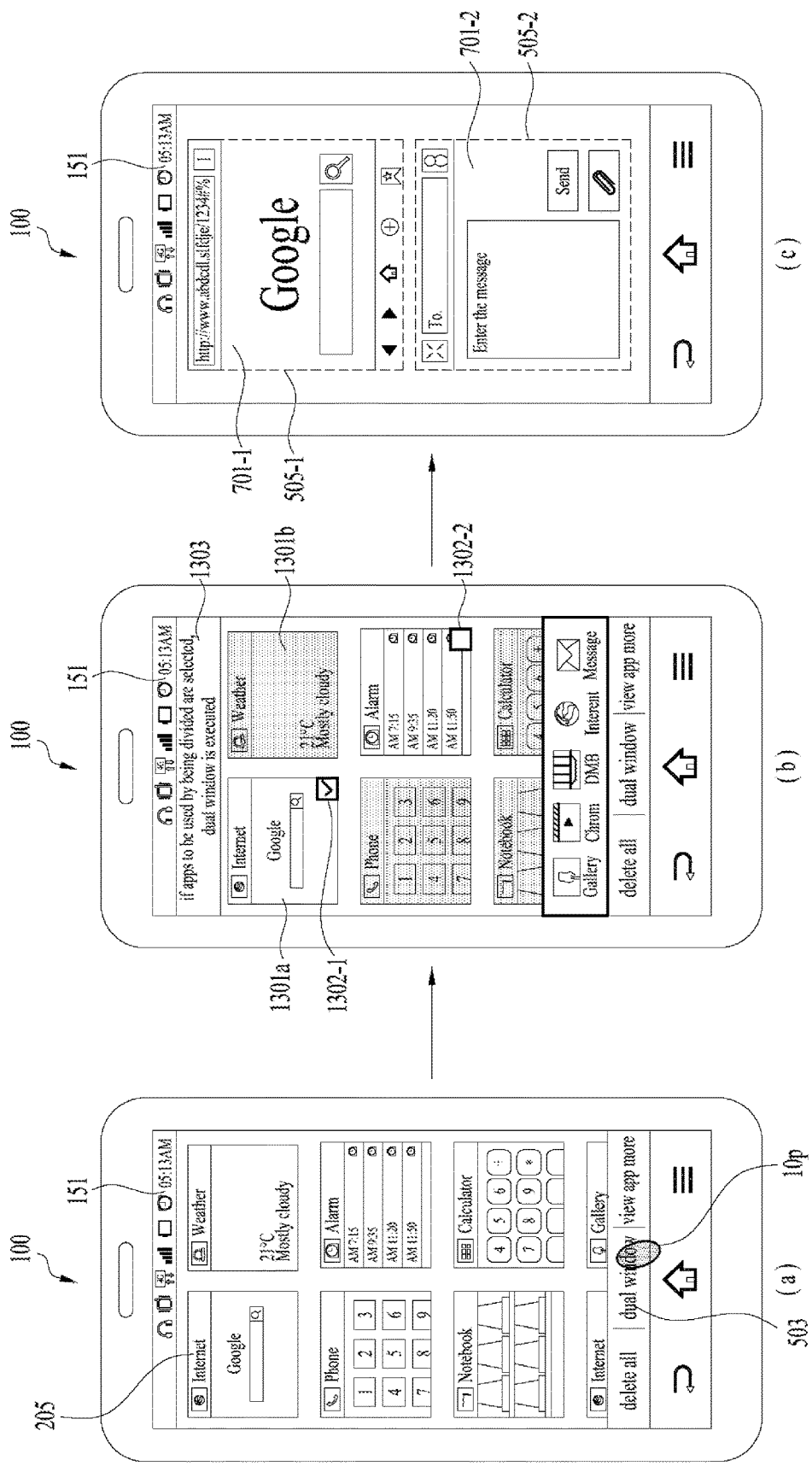
FIGS. 13 and 14 are diagrams illustrating a control method selecting a first and a second application to execute a dual window according to one embodiment of the present invention.
Figure 14:
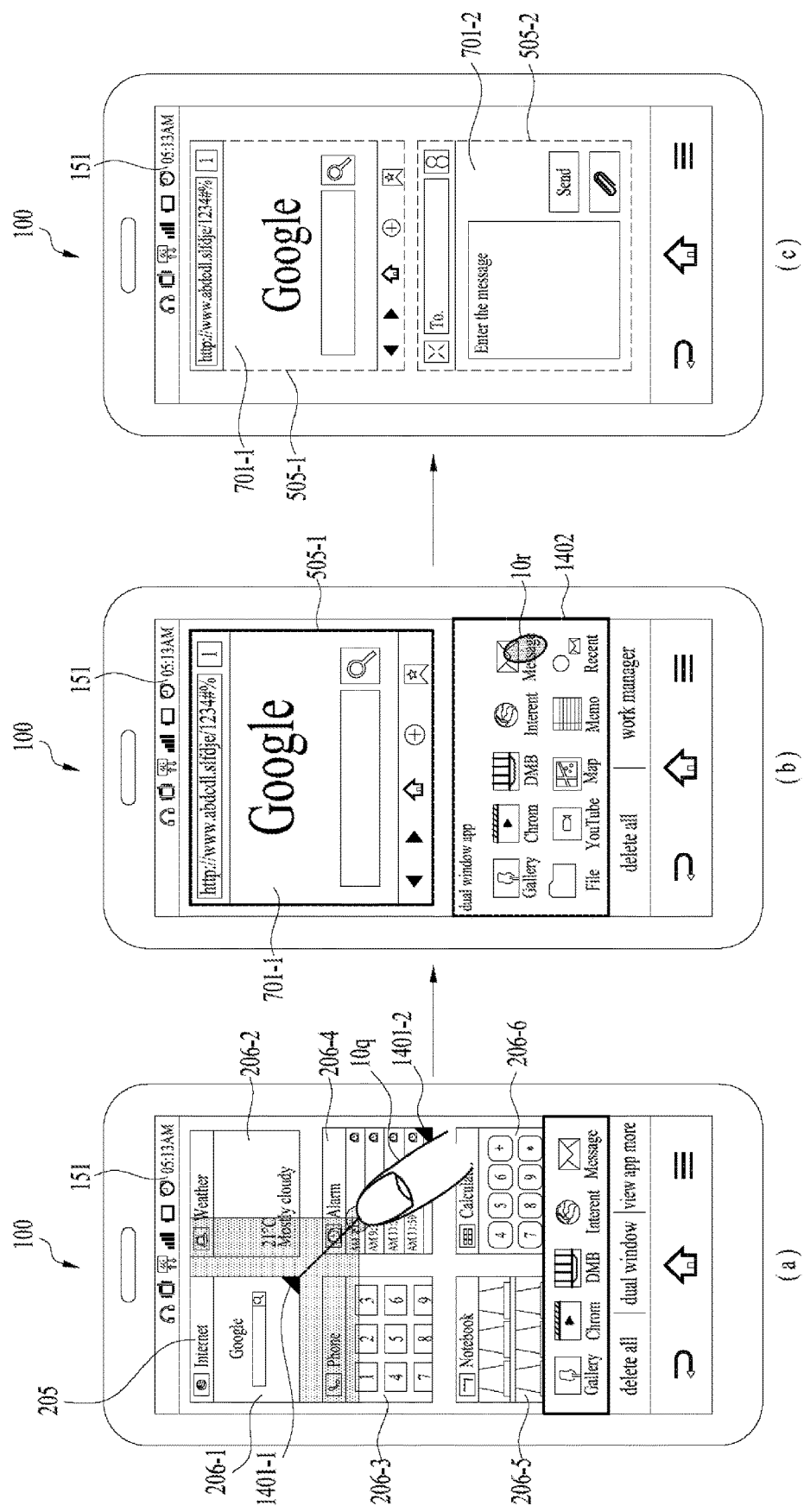

Next, FIGS. 13 and 14 are diagrams illustrating a control method selecting a first and a second application to execute a dual window according to one embodiment of the present invention. Referring to FIG. 13 (a), the controller 180 displays a dual window button 503 together with a list 205 of recently executed applications. If an input selecting the dual window button 503 is received, as shown in FIG. 13 (b), the controller 180 can output check boxes 1302-1/1302-2 on each item of the list 205 of the recently executed applications. According to the embodiment shown in FIG. 13, a selection is received via the check boxes.

If two applications are selected via the output check boxes 1302-1/1302-2, the controller 180 can execute a dual window (refer to FIG. 13 (c)). Meanwhile, assume that applications according to one embodiment of the present invention are classified into an application supporting a dual window and an application not supporting the dual window. In particular, a specific application may be not appropriate for executing the dual window. According to the embodiment, as shown in FIG. 13 (b), the controller 180 can distinctively output applications not supporting the dual window. As shown in an example of FIG. 13 (b), an application item supporting the dual window is not shaded 1301a and an application item not supporting the dual window is shaded 1301b.

Referring to FIG. 14 (a), the controller 180 displays a list 205 of recently executed applications and a selection icon 1401-1/1401-2 is output on each item of the list 205 of the recently executed applications. In particular, the embodiment shown in FIG. 14 includes an application selected by a user using a selection icon which is output on each item of a list of applications.

Meanwhile, in the embodiment explained in FIG. 14, applications are classified into an application supporting a dual window and an application not supporting the dual window. When outputting the selection icon 1401-1/1402-1, the controller 180 displays the selection icon 1401-1/1401-2 on the application supporting the dual window only among items of the list 205 of the recently executed applications (refer to FIG. 14 (a)). In particular, according to an example shown in FIG. 14 (a), a first selection icon 1401-1 and a second selection icon 1401-2 are output only on a first application item 206-1 and a fourth application item 206-4, respectively. In more detail, applications corresponding to the rest of the application items, i.e., a second, a third, a fifth and a sixth application item 206-2/206-3/206-5/206-6, do not support the dual window.

If a prescribed touch gesture is received on a certain selection icon from a user, the controller 180 can display an execution screen of an application corresponding to the prescribed selection icon. In particular, in FIG. 14 (a), if a prescribed touch gesture is input on the first selection icon 1401-1 existing on the first application item 206-1, as shown in FIG. 14 (b), the controller 180 can display a first application execution screen 701-1 on a first execution area 505-1 of the touch screen 151. The prescribed touch gesture may correspond to an input touching the first selection icon 1401-1 and dragging the first selection icon to a prescribed position while the touch is maintained.

As shown in FIG. 14 (b), the controller 180 can further display a list 1402 of applications arranged by a prescribed criteria while outputting the first application execution screen 701-1. The application list 1402 corresponds to a list used for receiving a selection of a second application. The application list 1402 may correspond to the aforementioned list 205 of the recently executed applications or a list of applications arranged by a high frequency order.

Subsequently, if an input selecting the second application from the output application list 1402 is received, the controller 180 can display a second application execution screen 701-2 on a second execution area 505-2 of a touch screen 151 (refer to FIG. 14 (c)). The second application execution screen 701-2 and the output first application execution screen 701-1 thus become a dual window.

Meanwhile, most of the touch screen 151 may be covered with an output of execution screens while the dual window is executing. Hence, if a virtual keypad is output, one of the execution screens may be blocked. In order to prevent an execution screen from being blocked by the keypad, a relevant embodiment is explained with reference to FIG. 15 in the following.

Figure 15:
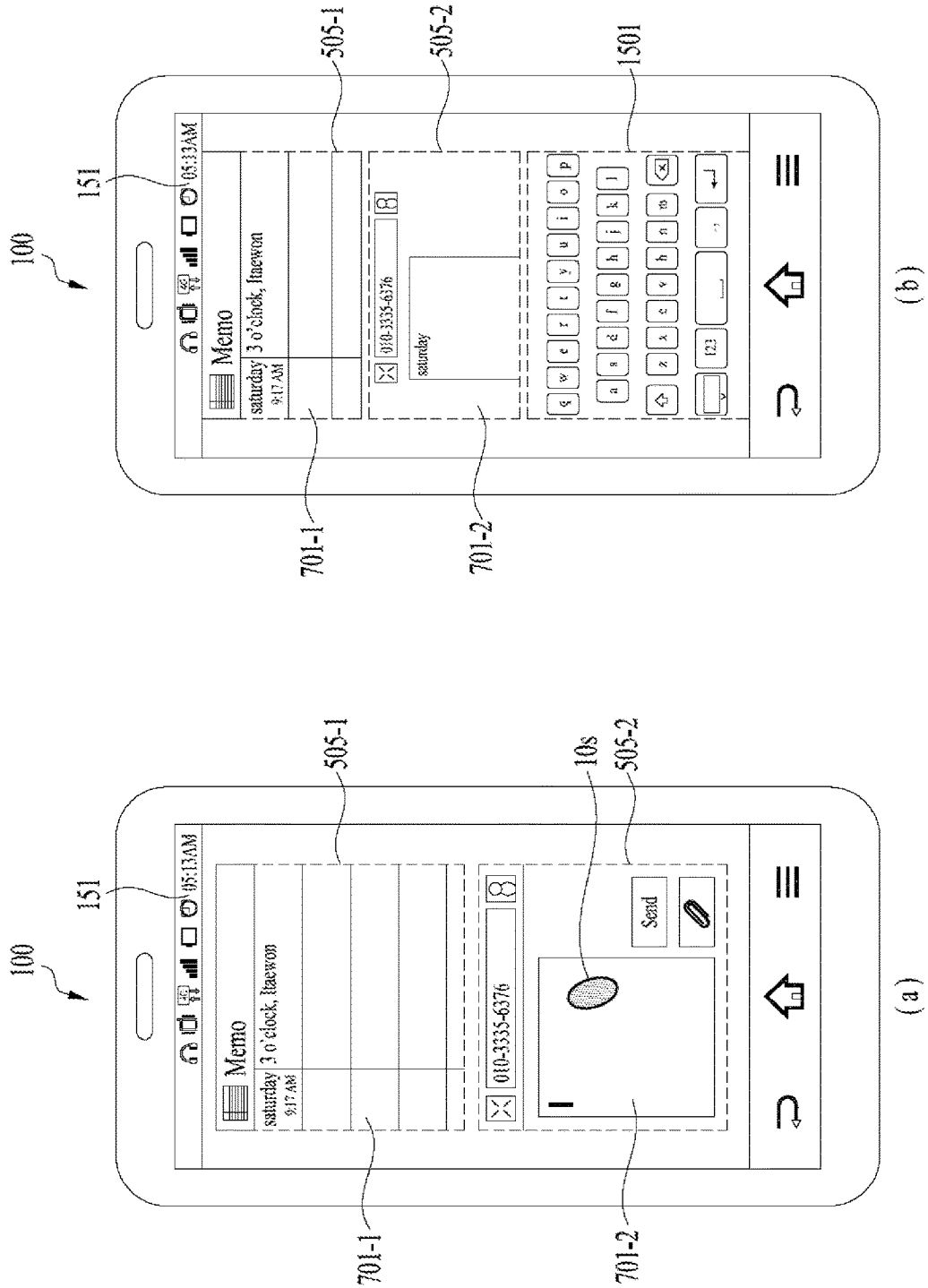
FIG. 15 is a diagram illustrating a control method outputting a virtual keypad while executing a dual window according to one embodiment of the present invention.

Next, FIG. 15 is a diagram illustrating a control method displaying a virtual keypad while executing a dual window according to one embodiment of the present invention. Referring to FIG. 15 (a), as mentioned in the foregoing description, the controller 180 displays a first and a second application execution screen 701-1/701-2 on a first and a second execution area 505-1/505-2, respectively.

If text input is required, the controller 180 arranges the first and the second execution area 505-1/505-2 by reducing a size of the first and the second execution area 505-1/505-2 and then displays a virtual keypad on a remaining space (keypad area) 1501 (refer to FIG. 15 (b)). The state requiring a text input indicates a state capable of anticipating a text input of a user. For instance, as shown in FIG. 15 (a), the state requiring a text input may correspond to when an input touching 10s a space where a text input is available is received.

Meanwhile, the aforementioned embodiment has explained a control method for a stationary execution area of an application. In the following, an execution area of a pop-up window form is proposed to enable a user to change an execution area of an application. Regarding this embodiment, it shall be described with reference to FIG. 16 and FIG. 17 in the following.

Figure 16:
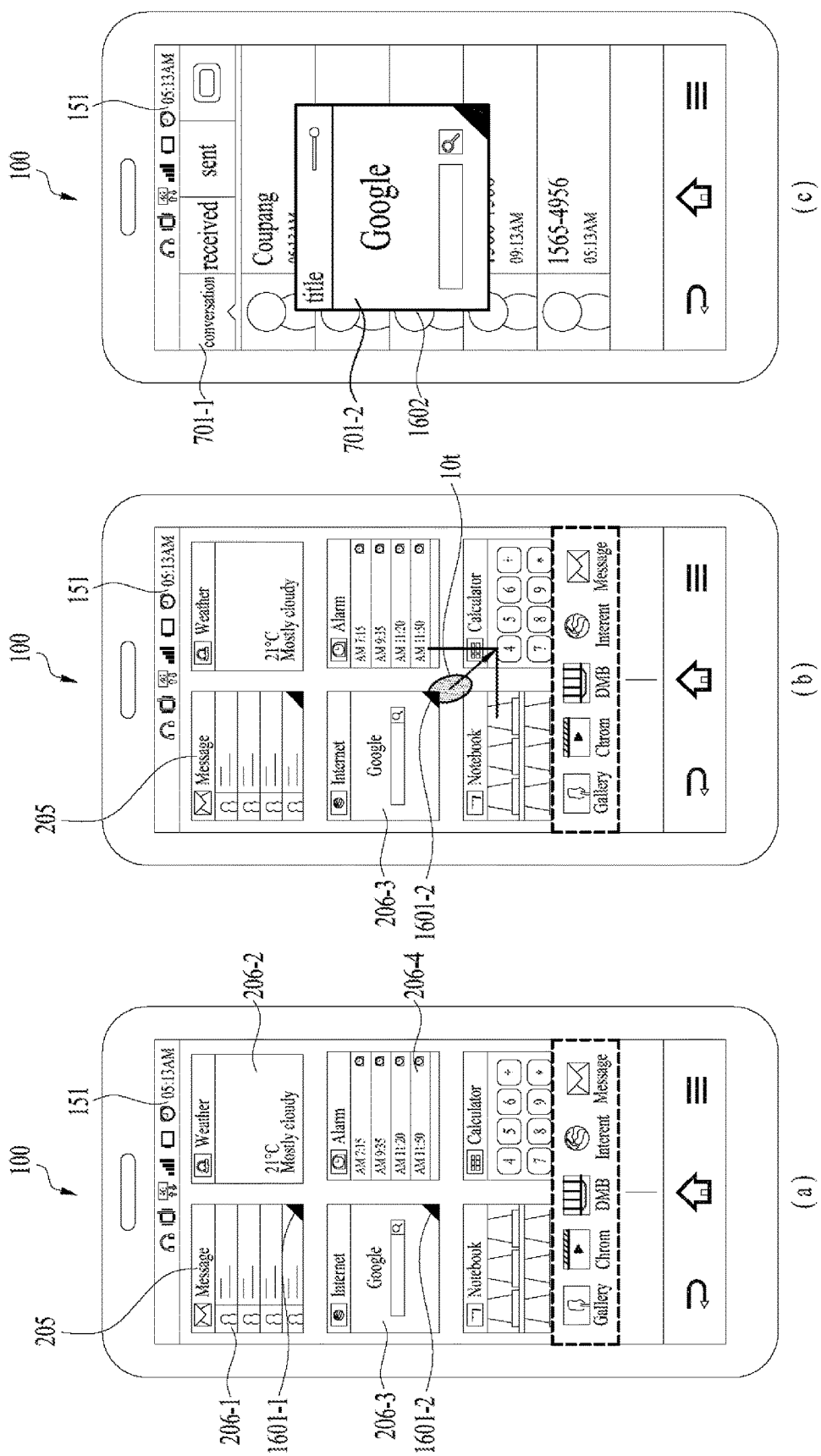
FIG. 16 is a diagram illustrating a control method executing a dual window using an execution area of a variable position according to one embodiment of the present invention.

FIG. 16 is a diagram illustrating a control method executing a dual window using an execution area of a variable position according to one embodiment of the present invention. Referring to FIG. 16 (a), the controller 180 displays a list 205 of recently executed applications. Assume that the list of the recently executed applications is called while a first application execution screen 701-1 is displayed. In addition, an activation icon is output on each item of the list 205 of the recently executed applications. Or, as shown in an example of FIG. 16 (c), the activation icon 1601-1/1601-2 can be output on an item of an application capable of supporting a dual window only.

The embodiment shown in FIG. 16 includes a second application is selected by a user using the output activation icon. If a prescribed touch gesture is input on a prescribed activation icon 1601-2, as shown in FIG. 16 (c), the controller 180 displays an execution pop-up window 1602 on a first application execution screen 701-1. In addition, the controller 180 can display a second application execution screen 701-2 on the output execution pop-up window 1602. The second application execution screen 701-2 may correspond to an execution screen of an application corresponding to the activation icon 1601-2 on which the prescribed touch gesture is input.

The prescribed touch gesture may correspond to an input touching 10t the activation icon 1601-2 and dragging the activation icon while the touch is maintained. A size of the execution pop-up window may correspond to a distance of the dragging. One embodiment of the present invention provides that the execution pop-up window 1602 is output by being moved according to a command of a user indicating the execution pop-up window to move. For instance, if a user touches an edge of the execution pop-up window 1602 and drags the edge while the touch is maintained, the controller 180 can change a position on which the execution pop-up window is output as much as a distance of which the execution pop-up window is dragged.

Figure 17:
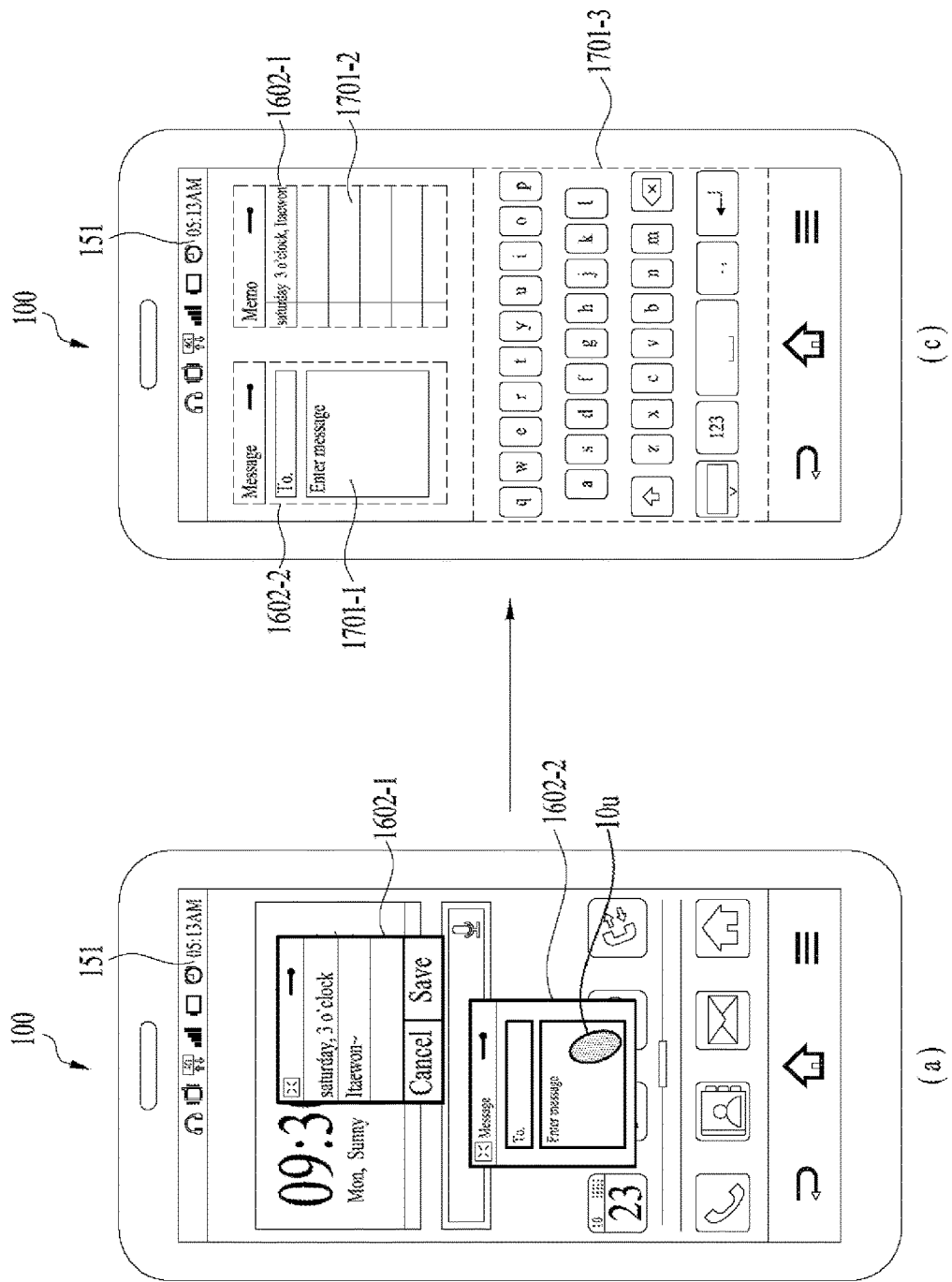
FIG. 17 is a diagram illustrating a first and a second pop-up window 1602-1/1602-2 output on a home screen of a mobile terminal 100 according to one embodiment of the present invention.

FIG. 17 is a diagram illustrating a first and a second pop-up window 1602-1/1602-2 output on a home screen of a mobile terminal 100 according to one embodiment of the present invention. According to one embodiment, the present invention adjusts a size and/or a position of an execution pop-up window when a virtual keypad is output. Referring to FIG. 17 (a), the first and the second pop-up window 1602-1/1602-2 are output on most part of a touch screen 151. Hence, if a virtual keypad is output, the virtual keypad may block a certain part of the first and the second execution pop-up window 1602-1/1602-2. Hence, one embodiment of the present invention provides that a size and/or a position of at least one of the first and the second execution pop-up window 1602-1/1602-2 is adjusted when the virtual keypad is output.

If a text input is required, the controller 180 adjusts a size and/or a position of the first and the second execution pop-up window to match the first and the second execution pop-up window 1602-1/1602-2 with the first and the second execution area 1701-1/1701-2, respectively (refer to FIG. 17 (b)). In addition, the controller 180 can output the virtual keypad on a third area 1701-3.

In this instance, text can be automatically rearranged to the adjusted size of a space, which is to be filled with the text, on the first and the second execution pop-up window 1602-1/1602-2. For instance, when a text is input on a first application execution screen, which is output on the first execution pop-up window 1602-1, if the text is input over the first execution pop-up window 1602-1, line feed can be automatically performed.

Meanwhile, a screen output via the aforementioned execution pop-up window corresponds to an execution screen of an actual application. Yet, an operation of outputting the execution screen of the actual application via the execution pop-up window may correspond to a work requiring considerable amount of calculation for a mobile terminal. Hence, a different embodiment of the present invention provides to simply output a snapshot of the application only on a pop-up window instead of the execution screen. This sort of pop-up window is called a snapshot pop-up window in the present invention. The snapshot pop-up window will be described with reference to FIGS. 18 to 20 in the following.

Figure 18:
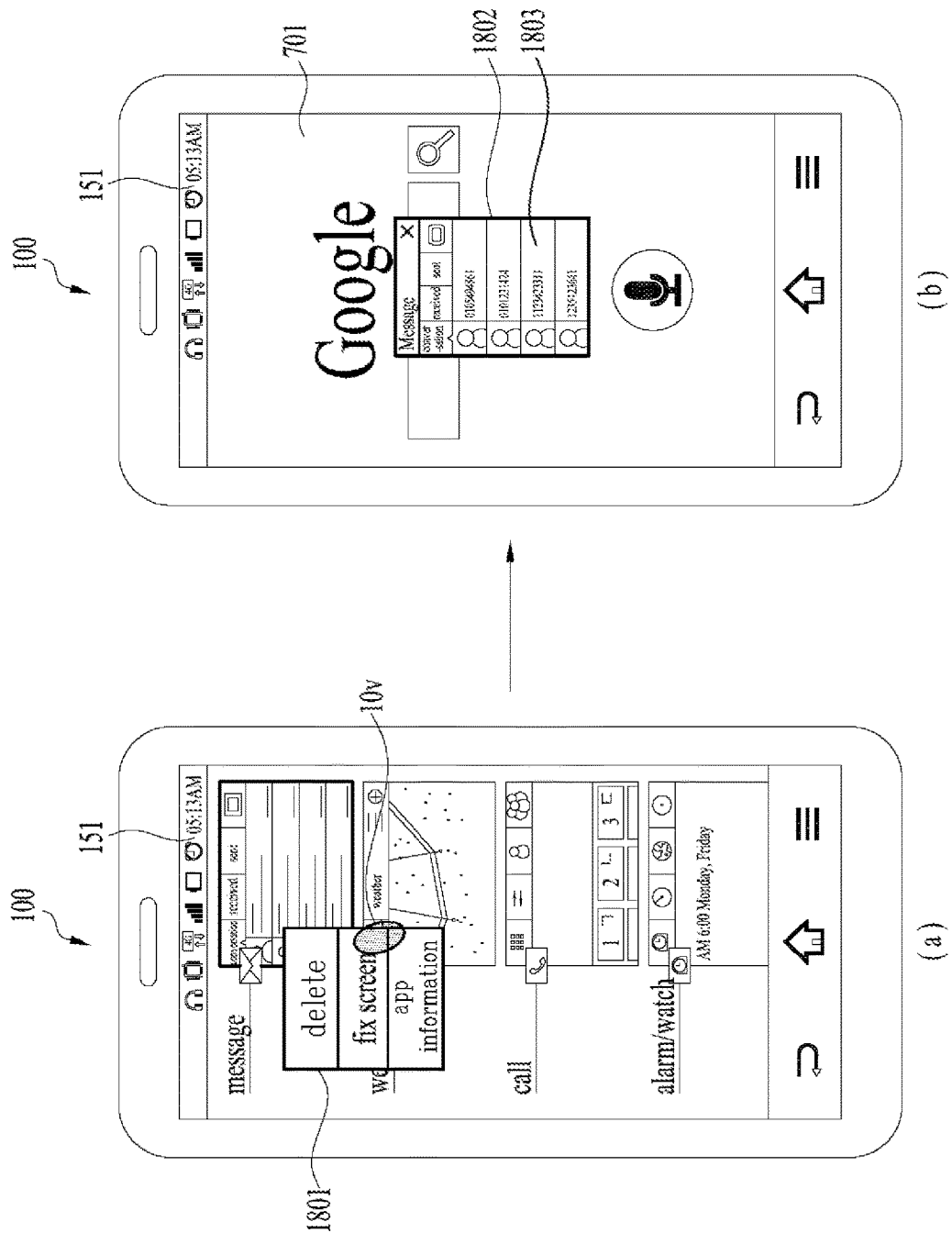
FIG. 18 is a diagram illustrating a control method displaying a snapshot pop-up window according to one embodiment of the present invention.

FIG. 18 is a diagram illustrating a control method displaying a snapshot pop-up window according to one embodiment of the present invention. Referring to FIG. 18 (a), the controller 180 displays a list 205 of recently executed applications. The controller 180 outputs an execution menu pop-up window 1801 for a prescribed application item on the output list 205 of the recently executed applications. The execution menu pop-up window 1801 can also be output when a menu call command is received on the prescribed application item.

According to an example of the execution menu pop-up window 1801 shown in FIG. 18 (a), a 'delete', a 'screen fix' and an 'app information' item are displayed, by which the present invention is non-limited. If an input 10v of a user selecting the 'screen fix' item is received, the controller 180 displays a snapshot pop-up window 1802 (refer to FIG. 18 (b)). In addition, the controller 180 can output a snapshot image 1803 corresponding to the prescribed application item on the snapshot pop-up window 1802.

The snapshot image 1803 corresponds to a captured image of an execution screen of an application corresponding to the prescribed application item. If a size of the snapshot image 1803 is greater than a size of the snapshot pop-up window 1802, the snapshot image 1803 can be provided by an internal scroll operation of the snapshot pop-up window 1802. The scroll operation will be described with reference to FIG. 19 in the following.

Figure 19:
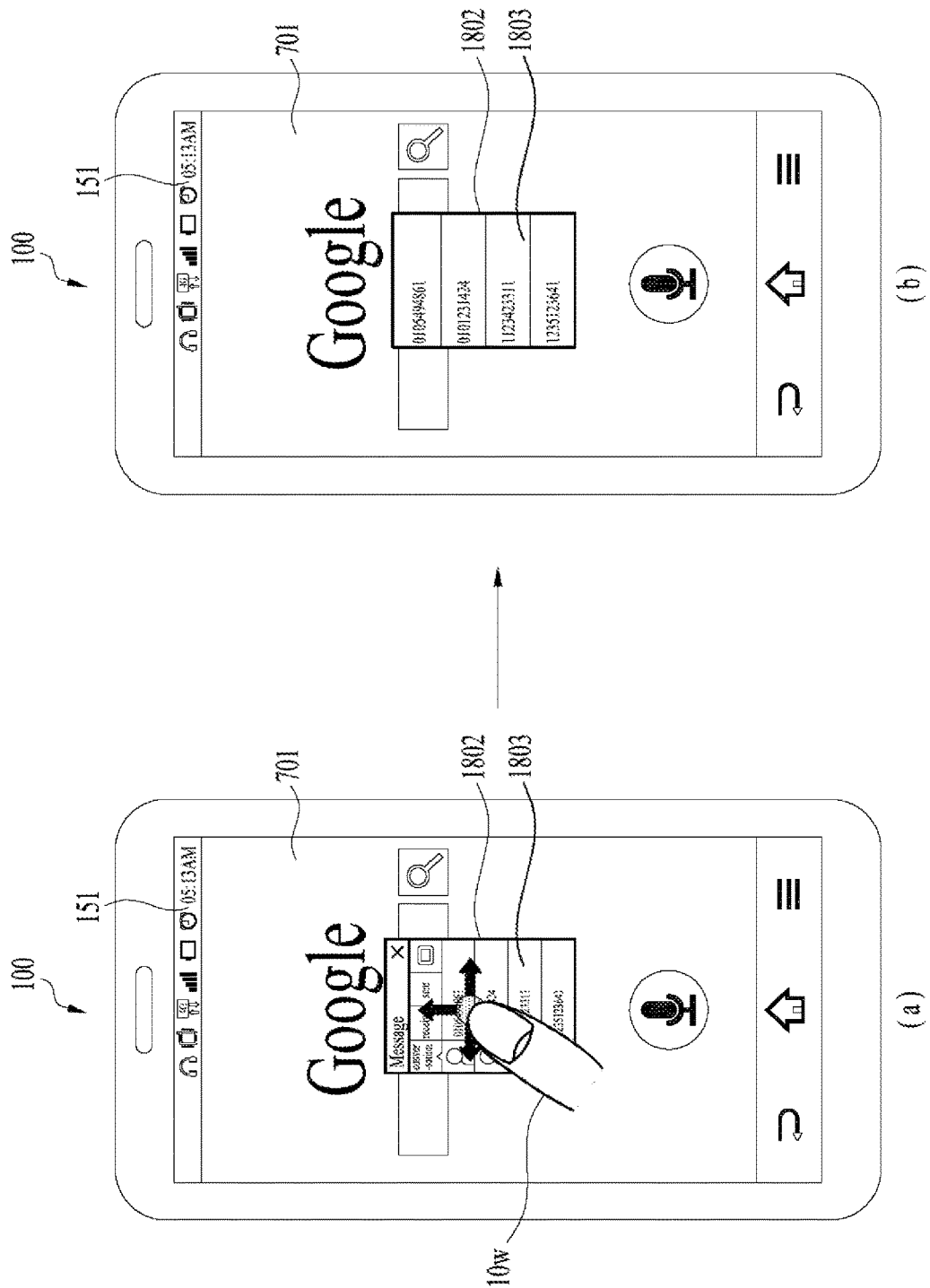
FIG. 19 is a diagram illustrating a control method providing snapshot images 1803, which are provided in a scroll form, of applications on an output snapshot pop-up window 1802 according to one embodiment of the present invention.

FIG. 19 is a diagram illustrating a control method providing snapshot images 1803 in a scroll form of applications on an output snapshot pop-up window 1802 according to one embodiment of the present invention. Referring to FIG. 19 (a), a snapshot pop-up window 1802 is output on a first application execution screen. In addition, a snapshot image 1803 is output in the snapshot pop-up window 1802. If a scroll input is received on the snapshot image 1803, the controller 180 can output the snapshot image 1803 by scrolling the snapshot image in every direction (refer to FIG. 19 (b)).

Figure 20:
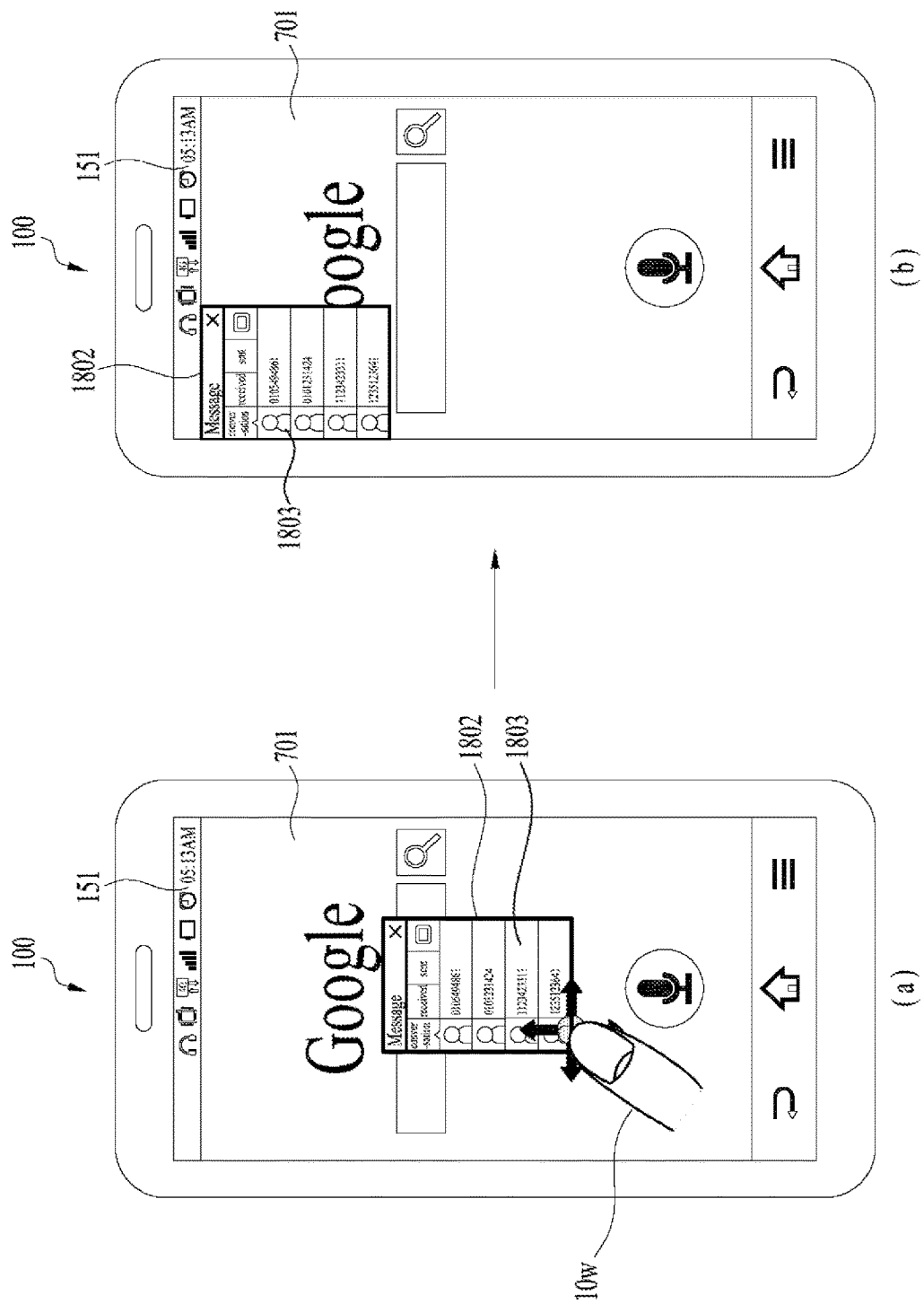
FIG. 20 is a diagram illustrating a control method changing an output position of an output snapshot pop-up window 1802 according to one embodiment of the present invention.

A control method using a position of the snapshot pop-up window 1802 is explained with reference to FIG. 20 in the following. FIG. 20 is a diagram illustrating a control method changing an output position of an output snapshot pop-up window 1802 according to one embodiment of the present invention.

Referring to FIG. 20 (a), a snapshot pop-up window 1802 is output on a first application execution screen. In addition, a snapshot image 1803 is output in the snapshot pop-up window 1802. If an input moving the snapshot pop-up window is received on the snapshot pop-up window 1802, the controller 180 can output the snapshot pop-up window by moving the snapshot pop-up window 1802 in every direction (refer to FIG. 20 (b)). The input moving the snapshot pop-up window may correspond to an input 10x touching an edge of the snapshot pop-up window 1802 and dragging the snapshot pop-up window to a preferred position.

Advantages the mobile terminal according to an embodiment of the present invention and a method of controlling therefor are explained in the following. For example, the mobile terminal provides execution screens for a plurality of applications at the same time. Also, the user convenience is enhanced when simultaneously providing execution screen for a plurality of applications.

The above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). In addition, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a wireless communication unit configured to provide wireless communication;
a touch screen; and
a controller coupled to the wireless communication unit and the touch screen, the controller configured to:
display a list of recently executed applications as thumbnail images on the touch screen,
display first and second slot indicators together with at least a portion of the list of recently executed applications, the first slot and second slot indicators indicating a position and a size of first and second execution areas, respectively, wherein the first and second slots indicators are displayed after in time the list of recently executed applications is displayed, receive a first selection input of a first application from the displayed list and a second selection input of a second application from the displayed list, and once the first and second selection inputs are received, display at the same time an execution screen of the selected first and second applications on the first and second execution areas of the touch screen, respectively, together with the list of recently executed applications, wherein the first slot indicator is replaced with the first execution area on which the execution screen of the first application is displayed and wherein the second slot indicator is replaced with the second execution area on which the execution screen of the second application is displayed.

2. The mobile terminal of claim 1, wherein the thumbnail images correspond to snapshot images of application execution screens of the applications.

3. The mobile terminal of claim 2, wherein the controller is further configured to:

display the first and second slot indicators at a top of the list of recently executed applications.

4. The mobile terminal of claim 2, wherein the controller is further configured to:

display a guide message indicating the first and second applications can be selected from the displayed list and added to the first and second execution areas to display the execution screens of the selected first and second applications.

5. The mobile terminal of claim 2, wherein the first and second slot indicators comprise graphical representations outlining an area of the touch screen to display the execution screens of the selected first and second applications.

6. The mobile terminal of claim 2, wherein the controller is further configured to:

display a keypad on the touch screen for entering data used by the first executed application, and rearrange at least one of the size and the position of the first and second execution areas so the first and second execution areas do not overlap with the displayed keypad.

7. The mobile terminal of claim 1, wherein the first selection input of the first application corresponds to touching and dragging of the thumbnail image of the first application to the first execution area.

8. The mobile terminal of claim 1, wherein the controller is further configured to:

display the list of recently executed applications as thumbnail images in response to a selection of a soft key displayed on the touch screen.

9. The mobile terminal of claim 1, wherein the controller is further configured to:

receive a touch selection of the execution screen of the first application displayed in the first execution area, and display a keypad on the touch screen for entering data used by the first executed application, and wherein the keypad replaces the list of recently executed applications.

10. The mobile terminal of claim 1, wherein the controller is further configured to:

display the execution screen of the first executed application on an entire area of the touch screen before the selection input is received, display the list of recently executed applications including the first executed application on the touch screen in response to a selection of a key button on the mobile terminal, receive an input for displaying a dual window including the first and second execution areas on the touch screen, display a list of application icons in response to the input for displaying the dual window, receive a selection of two of the application icons in the displayed list of application icons, and display the execution screen of the first and second applications in the first and second execution areas.

11. The mobile terminal of claim 10, wherein the list of application icons corresponds to frequently used applications.

12. The mobile terminal of claim 1, wherein no execution screen of an application is displayed in the first slot indicator.

13. A method of controlling a mobile terminal, the method comprising:

displaying, via a touch screen of the mobile terminal, a list of recently executed applications as thumbnail images on the touch screen;

displaying, via the touch screen, first and second slots indicators together with at least a portion the list of recently executed applications, the first and second slot indicators indicating a position and a size of first and second execution areas, respectively, wherein the and second slots indicators are displayed after in time the list of recently executed applications is displayed;

receiving, via a controller of the mobile terminal, a first selection input of a first application from the displayed list and a second selection input of a second application from the displayed list; and once the first and second selection inputs are received, displaying at the same time, via the touch screen, an execution screen of the selected first and second applications on the first and second execution areas of the touch screen, respectively, together with the list of recently executed applications, wherein the first slot indicator is replaced with the first execution area on which the execution screen of the first application is displayed and wherein the second slot indicator is replaced with the second execution area on which the execution screen of the second application is displayed.

14. The method of claim 13, wherein the thumbnail images correspond to snapshot images of application execution screens of the applications.

15. The method of claim 14, further comprising:

displaying the first and second slot indicators at a top of the list of recently executed applications.

16. The method of claim 14, further comprising:

displaying a guide message indicating the first and second applications can be selected from the displayed list and added to the first and second execution areas to display the execution screens of the selected first and second applications.

17. The method of claim 14, wherein the first and second slot indicators comprise graphical representations outlining an area of the touch screen to display the execution screens of the selected first and second applications.

18. The method of claim 13, wherein the first selection input of the first application corresponds to touching and dragging of the thumbnail image of the first application to the first execution area.

19. The method of claim 13, further comprising:
displaying the list of recently executed applications as thumbnail images in response to a selection of a soft key displayed on the touch screen.

* * * * *